United States Patent [19]

Ames et al.

[11] Patent Number: 4,787,040
[45] Date of Patent: Nov. 22, 1988

[54] DISPLAY SYSTEM FOR AUTOMOTIVE VEHICLE

[75] Inventors: Richard N. Ames; Layton Balliet, both of Boca Raton; Richard V. Ballou, Lake Worth; Stanley M. Belyeu, Boca Raton; Joseph A. Boscove, Highland Beach; Akram Bou-Ghannam, Boca Raton; Peter Langer, Coral Springs; Andrew B. McNeill, Deerfield Beach; Gerald U. Merckel, Delray Beach; Robert V. Miller; Thomas K. Pate, both of Boca Raton, all of Fla.; Nicholas J. Schwartz, San Francisco, Calif.; Frederick T. Slater, Boca Raton, Fla.; Stanford A. Strickland, Boca Raton, Fla.; William C. Troop, Boca Raton, Fla.

[73] Assignee: International Business Machines Corporation, Armonk, N.Y.

[21] Appl. No.: 945,053

[22] Filed: Dec. 22, 1986

[51] Int. Cl.⁴ .................. G09G 1/00; G06F 15/20
[52] U.S. Cl. .................. 364/424.01; 364/132; 364/521
[58] Field of Search ... 364/424, 518, 521, 200 MS File, 364/900 MS File, 132, 140, 141, 144, 146

[56] References Cited

U.S. PATENT DOCUMENTS

| | | | |
|---|---|---|---|
| 4,464,933 | 8/1984 | Santis | 73/432 AD |
| 4,535,330 | 8/1985 | Carey et al. | 340/825.5 |
| 4,571,684 | 2/1986 | Takanabe et al. | 364/449 |
| 4,618,858 | 10/1986 | Belch | 340/724 |
| 4,677,450 | 6/1987 | Ito et al. | 364/449 |

OTHER PUBLICATIONS

Copies, set of seven (7) Photographs—Concept Car No. 1.
Copies, set of five (5) Photographs—Concept Car No. 2.
Article: "A Slow Start in a Cold Market", C. W. Beardsley, Automotive Electronics, IEEE Spectrum, Sept. 1972, pp. 22-31.
Article: "The Use of Microprocessors as Automobile On-Board Controllers", R. H. Temple et al., Ford Motor Company, Computer, Aug. 1974, pp. 33-36.
Article: "Electronic Display Systems in the Automobile", M. U. Trenne et al., SAE Special Pubs #393 for Meeting Feb. 24-28, 1975, Paper #750365, pp. 101-107.
Article: "Evolving Microprocessors Which Better Meet the Needs of Automotive Electronics", J. Marley, Proceedings of the IEEE, vol. 66, No. 2, Feb. 1978, pp. 142-150.

(List continued on next page.)

*Primary Examiner*—Parshotam S. Lall
*Assistant Examiner*—Thomas G. Black
*Attorney, Agent, or Firm*—Richard A. Tomlin

[57] ABSTRACT

An advanced display system controller is described for use in automotive vehicles. The controller has electronic circuitry to allow it to be programmed to display monochrome or color grahics and text on an all-points-addressable display device such as a CRT or an Electro-Luminescent (EL) Flat panel. The display resolution and scan rates may be programmed differently depending on the display type and size. The vehicle operator controls the display system via a reconfigurable switch system (RSS), such as an Infrared Touch Panel or Mylar Touch Switch Matrix mounted over the face of the display. In addition, external discrete switches may also be attached to the controller. The controller includes a master microprocessor and a slave microprocessor with preferred partitioning of functions and communicates with other parts of the vehicle via two serial data communication links, a Random Access bus and a Poll/Response bus. The design of this controller allows the display characteristics and supported functions to be changed through reconfigurable hardware and software, allowing a broad range of applications in different model automobiles.

12 Claims, 28 Drawing Sheets

OTHER PUBLICATIONS

Article: "Evaluating Pictographic Symbols: An Automotive Application", P. Green et al., Human Factors, vol. 20, No. 1, Feb. 1978, pp. 103-114.

Article: "Simplification of System Inputs and Outputs for MPU Control Units", J. Marley, Society of Automotive Engineers, Technical Paper Series, No. 780123, Feb. 27-Mar. 3, 1978.

Article: "Electronics in the Driving Seat", C. Weinstein, Electronics and Power, vol. 24, No. 4, Apr. 1978, pp. 269-272.

Article: "Developments in Automotive Electronics", M. H. Westbrook, Automotive Engineer, Aug./Sep. 1979, pp. 19-23.

Article: "Automobile Electronics for 1980", G. Flynn, General Motors Product Engineering, Sep. 1979, pp. 69-71.

Article: "Displays for Driver Instrumentation: Today and a Look Toward Tomorrow", R. A. Young et al., IEEE Conf. Publ. N181 Int'l Conf. on Automobile Electronics, London, England, Oct. 20-Nov. 2, 1979, Publ. 1979, pp. 293-297.

Article: "Integrated Timer Controller of Automotive Electrical System", A. Ueda et al., IEE Second Int'l Conf. of Automotive Electronics, Oct. 29-Nov. 2, 1979, London, England, pp. 49-53.

Article: "On Board Control and Monitoring Systems of Automotive Vehicles", E. Zuckmantel, IEE Second Int'l Conf. on Automotive Electronics, London, Oct. 29-Nov. 2, 1979, pp. 253-257.

Article: "Automotive Signalbus Multiplex Wiring System", R. R. Foerste, IEE Second Int'l Conf. on Automotive Electronics, London, Oct. 29-Nov. 2, 1979, pp. 263-267.

Article: "A Multiplexed Wiring System for Cars and Its Electronics", J. R. Massaoubre et al., IEE Second Int'l Conf. on Automotive Electronics, Oct. 29-Nov. 2, 1979, pp. 268-272.

Article: "Electronic Multiplexing for Vehicles", M. J. Hampshire et al., IEE Second Int'l Conf. on Automotive Electronics, Oct. 20-Nov. 2, 1979, pp. 273-277.

Article: "Optical Multiplex Systems for Vehicles", Wesley R. Rogers, SPIE vol. 224, Fiber Optics for Communications and Control 1980, (General Motors Corporation, U.S.A.).

Article: "A Dedicated Single-Chip Microcomputer for Automotive Dashboard Applications", R. Muller, Society of Automotive Engineers, Inc., Technical Paper Series No. 810307, Feb. 23-27, 1981, pp. 97-100.

Article: "An Innovative Approach in Designing an Electronic Instrument Cluster", F. O. Miesterfeld, Society of Automotive Engineers, Congress and Exposition, Detroit, MI, Technical Paper Series 810308, Feb. 23-27, 1981, pp. 101-106.

Article: "Multiprocessor Implementation of the Logic Function of a Multiplexed Wiring System for Automotives", N. C. G. N. Preston et al., IEE Proc., vol. 129, Pt. E, No. 6, Nov. 1982, pp. 223-228.

Article: "Microprocessor Controls LCD Instrument Cluster", Society of Automotive Engineers, Inc., 1983, pp. 37-41.

Article: "Microcomputer-Controlled Liquid Crystal Display for Automobiles", K. Horikiri et al., IEEE Transactions on Industrial Electroncis, vol. IE-30, No. 2, May 1983, pp. 138-142.

Article: "Touch Sensitive Displays for Operation and Control", M. Menkin et al., Electronic Engineering, Sep. 1983, pp. 177-180.

Article: "Trends in the Development of Vehicle Instruments", W. H. Hucho, Int'l Journal of Vehicle Design, vol. 5, No. 3, pp. 291-304.

Article: "Automotive Electronics Shift Into Overdrive", E. L. Keller, Electronics Special Report, Jan. 26, 1984, pp. 101-110.

Article: "Sophisticated Electronics Look Good Behind the Wheel and Linking Up Smart Systems", M. Berger et al., Electronics, Jan. 26, 1984, pp. 110-112.

Article: "High Technology Meets the Dashboard", P. Kienert, New York Times, Jan. 29, 1984, Section 12, p. 21.

Article: "Control Panels: From Pushbuttons to Keyboards to Touchscreens", W. R. Flynn, Control Engineering Special Report, vol. 31, No. 6, Jun. 1984, pp. 79-81.

Article: "More Electronics in Detroit's 1985 Models", R. K. Jurgen, Senior Editor, IEEE Spectrum, Oct. 1984, pp. 54-60.

Article: "Micros Hit the Road", D. Whiteside, Datamation, Oct. 1, 1984, pp. 22-26.

Article: "Space-Age Technology Makes New Cards More 'Payload Sensitive'", C. E. Dole, The Christian Science Monitor, Oct. 25, 1984, p. 29.

Article: "GM Tests Video Display in 1984 Production Car", D. M. Weber, Electronics Week, Nov. 12, 1984, pp. 28-29.

OTHER PUBLICATIONS

Article: "Driving By Fingertip", edited by J. A. Conway, Forbes, Nov. 19, 1984, p. 8.
Article: "Automakers Shift to Processors", R. Valentine et al., Electronics Week, Dec. 19, 1984, pp. 61–65.
Article: "Video Screen for Dashboard", M. Shuon, New York Times, Dec. 13, 1984, Section D2.
Article: "Centralized Electronics: Window to Tomorrow's Cars", C. E. Dole, The Christian Science Monitor, Apr. 22, 1985, pp. 28–31.
Article: "The High Tech Car Hits the Road", Peter Petri, Fortune, Apr. 29, 1985, pp. 204–224.
Article: "Slow and Steady is the New Strategy in Automotive Electronics", D. M. Weber, Electronics Special Report, Jun. 17, 1985, pp. 47–52.
Article: "Boob-Tube Buick", Jim Hall, Motor Trend, Apr. 1985, pp. 47, 50, 147.
Article: "Motoring at 6MHz", John Eckhouse, PC World Special Edition, Apr. 1986, pp. 108–109.
Brochure: "High Technology from Buick", Ref. Buick Riviera Graphic Control Center, published by Product Information Buick Motor Division, (General Motors Division, U.S.A.).
Article: "An Interactive Reconfiguration Display System for Automotive Instrumentation", Jesse Ortega et al., SAE Soc. of Automotive Engineers Congress and Exposition, Warrendale, Pa., Feb. 24–28, 1986, pp. 1–14, Tech. Paper Ser. 860173.
Article: "At Your Fingertips: Computer Come Along for the Ride", J. Mateja, Discovery Magazine of American Travel, Silver Anniversary Edition, Spring 1986, p. 7.
Article: "Computerizing Cars", J. Zygmont, High Technology, Mar. 1986, pp. 60–61.
Article: "Can Touch-Screen Technology Move Beyond Special Uses?", T. Naegele, Electronics, May 5, 1986, pp. 42–43.

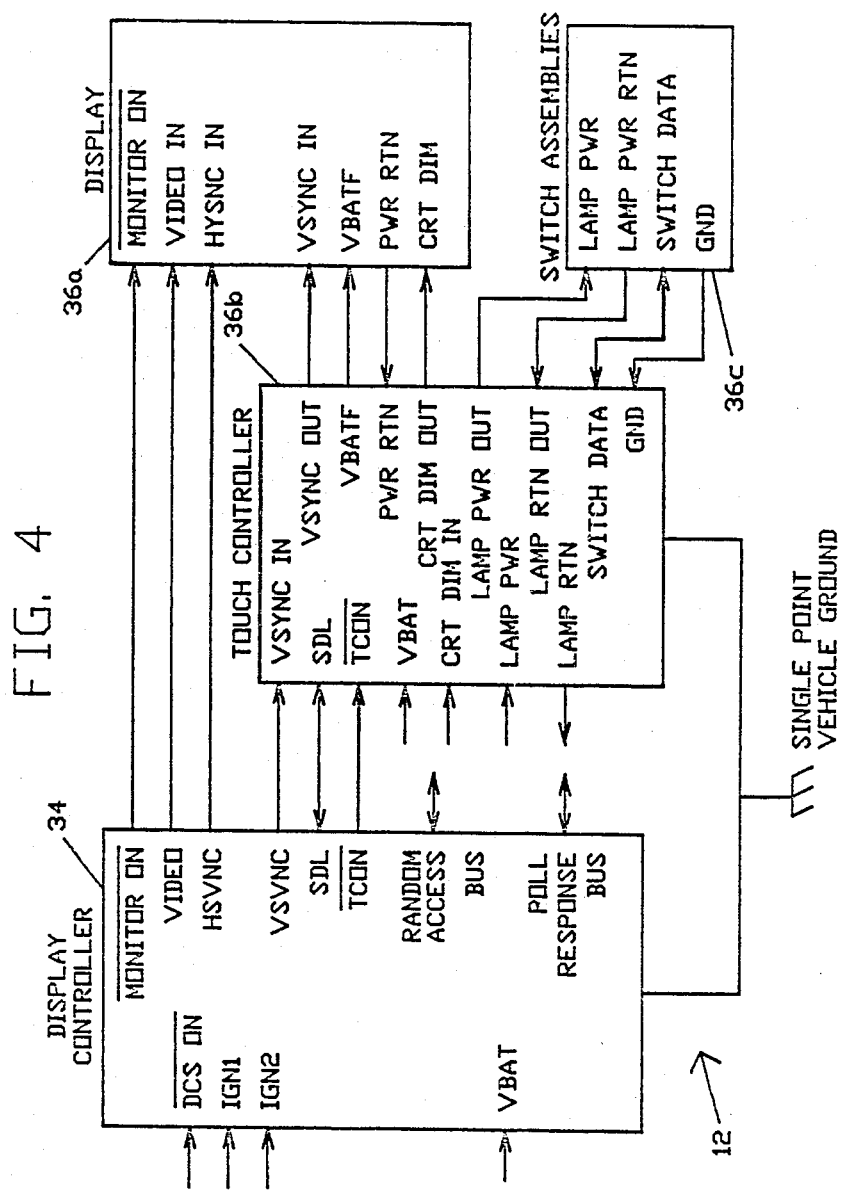

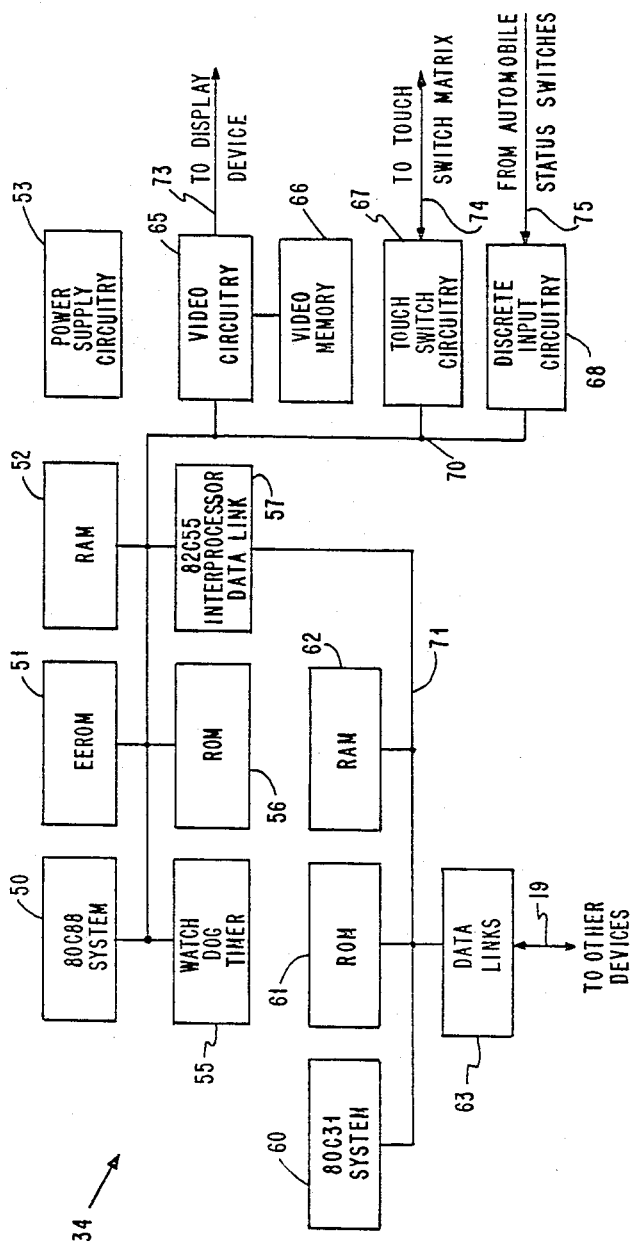

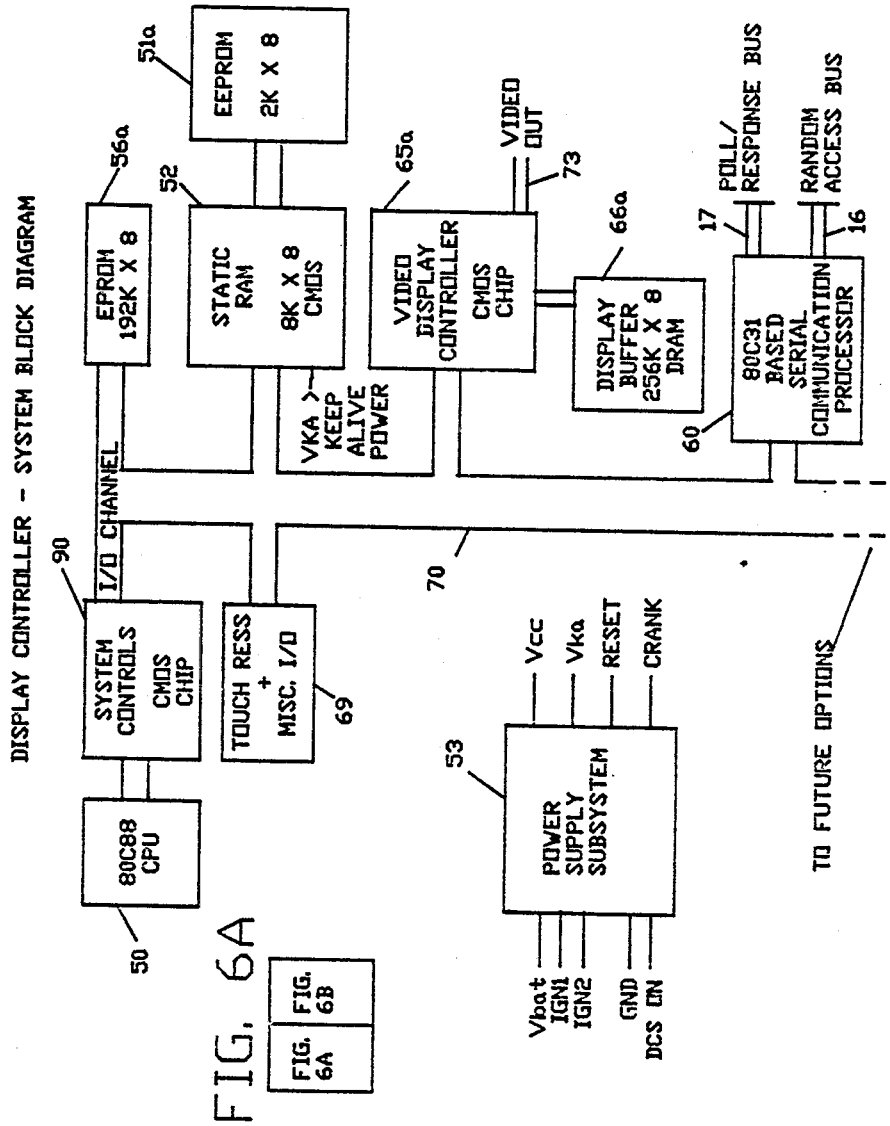

EXPANDED DISPLAY CONTROLLER - SYSTEM BLOCK DIAGRAM

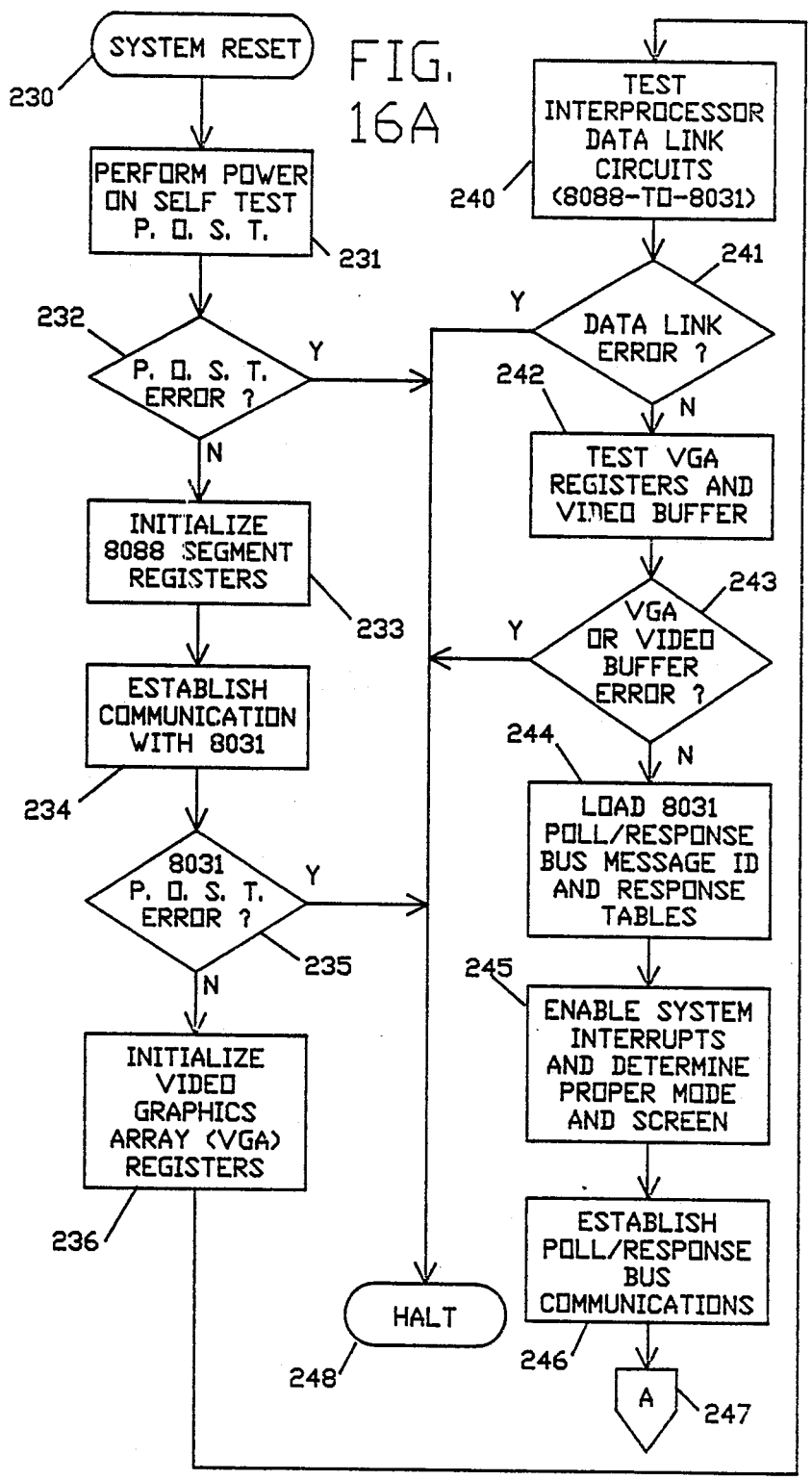

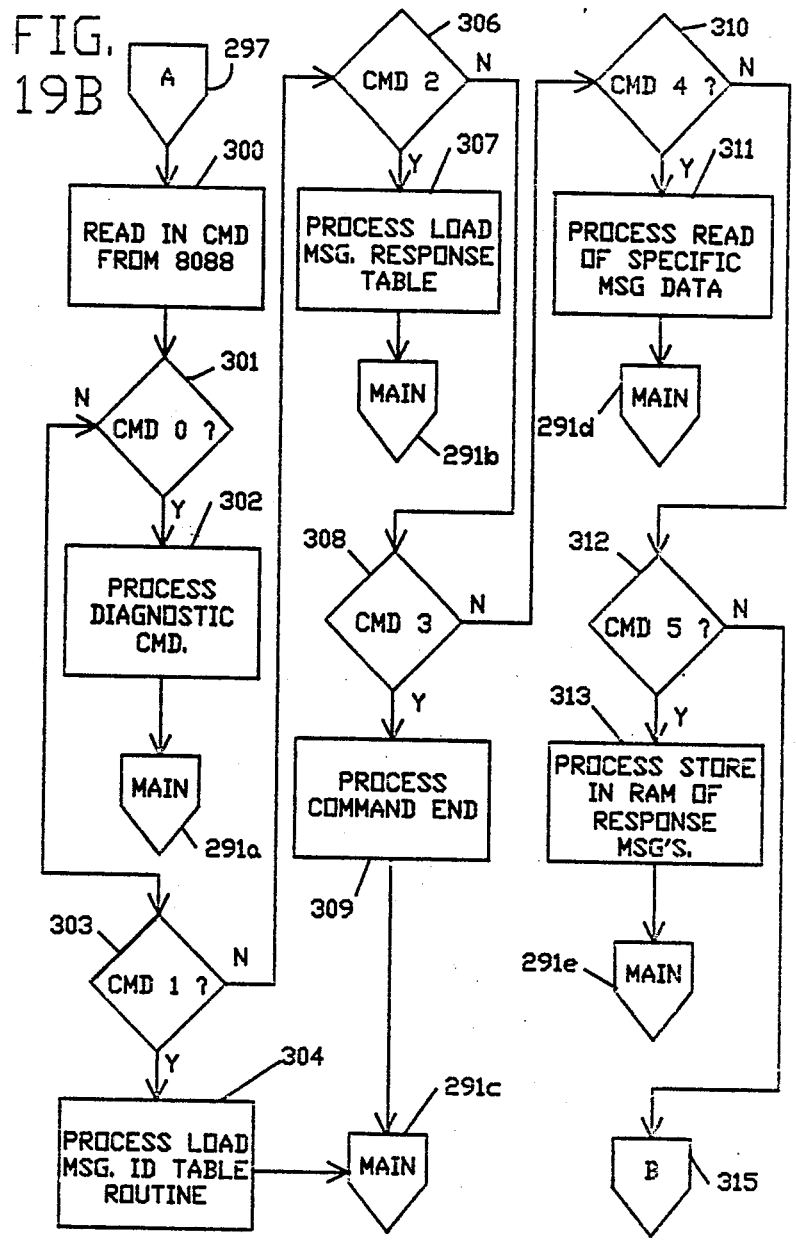

DISPLAY SYSTEM FOR AUTOMOTIVE VEHICLE

CROSS REFERENCE TO RELATED APPLICATION

Cross reference is made to the following patent application, such application having a common filing date and a common assignee with the present application:

U.S. patent application Ser. No. 06/945,431, filed Dec. 22, 1986, entitled "System for Creating and Controlling Interactive Graphic Display Screens" having R. V. Ballou et al as inventors.

PRIOR ART REFERENCES

The following references are of interest and ar representative of the prior art.
1. Article: "Evolving Microprocessors Which Better Meet The Needs Of Automotive Electronics" John Marley, Proceedings of the IEEE, Vol. 66, No. 2, February 1978, Pp. 142–150.
2. Article: "Evaluating Pictographic Symbols: An Automotive Application" Paul Green et al, Human Factors, Vol 20, No. 1, February 1978, Pp. 103–114.
3. Article: "Simplification Of System Inputs And Outputs For MPU Control Units" John Marley, Society of Automotive Engineers, Technical Paper Series No. 780123, Feb. 27–Mar. 3, 1978, Pp. 1–6.
4. Article: "An Innovative Approach In Designing An Electronic Instrument Cluster" Frederick O. R. Miesterfeld, Society of Automotive Engineers, Congress and Exposition Detroit, MI Technical Paper Series No. 810308, Feb. 23–27, 1981, Pp. 101–106.
5. Article: "Multiprocessor Implementation 0f The Logic Function Of A Multiplexed Wiring System For Automotives" N. C. G. N. Preston et al, IEE Proc., Vol. 129, Pt. E, No. 6, November 1982, Pp. 223–228.
6. Article: "Touch Sensitive Displays For Operation And Control" Michael Menkin et al, Electronic Engineering, September 1983, Pp. 177–180.
7. Article: "More Electronics In Detroit's 1985 Models" Ronald K. Jurgen, Senior Editor, IEEE Spectrum, October 1984, Pp. 54–60.
8. Article: "Micros Hit The Road", David Whiteside, Datamation, Oct. 1, 1984, Pp. 22–26.
9. Article: "GM Tests Video Display In 1984 Production Car, David M. Weber, Electronics Week, Nov. 12, 1984, Pp. 28–29.
10. Article: "Automakers Shift To Processors" Richard Valentine et al, Electronics Week, Dec. 10, 1984, Pp. 61–65.
11. Article: "An Interactive Reconfigurable Display System For Automotive Instrumentation" Jesse Ortega et al, SAE Society of Automotive Engineers Congress and Exposition SAE, Warrendale, PA Feb. 24–28, 1986, Pp. 1–14. Technical Paper Series No. 860173
12. Article: "Motoring At 6 MHz" John Eckhouse, PC World, April 1986, Pp. 108–109.
13. Brochure: "High Technology From Buick" Buick Riviera Graphic Control Center Published by Product Information Buick Motor Division, (General Motors Corporation, USA).

BACKGROUND OF THE INVENTION

This invention relates to display system controllers for use in automotive vehicles. In recent times, as the cost of advanced technology electronic devies has been decreasing and the cost of energy has been increasing, more and more applications for electronics have become practical and useful in the automotive environment. The use of microprocessors for the efficient control of the automobile engine was the first practical example of this technology. More recently, microprocessors have been placed in radios, climate control systems, instrument panels, etc. The references noted above describe a variety of prior systems of interest. References 1, 3, 4, 5, 7, 8 and 10, for example, describe the use of microprocessors in automotive vehicles. Reference 2 illustrates pictographic symbols (icons) for use in automotive applications. Reference 6 discusses the use of touch sensitive displays. Reference 9 describes the 1984 Buick Questor while References 11, 12 and 13 describe the 1986 Buick Riviera Graphic Control Center.

SUMMARY OF INVENTION

An advanced display system controller is described for use in automobiles or other vehicles. The controller provides flexibility of function, environmental compatibility, and high reliability. The controller has most functions which are normally provided by way of discrete switches, knobs and visual indicators on the dashboard of the vehicle. This is done by simulating the buttons, knobs, and indicators with graphical and textual information shown on a display screen. In addition, other useful functions are provided which are not normally available. The display system is designed to serve as a centralized control point for most vehicle comfort, entertainment, and information display functions. The use of a microprocessor based display controller of this type also facilitates advanced functions such as sophisticated trip computer functions, appointment calendar, mobile phone directory with automatic dialing, calculator, and electronic compass display, to name a few. The design of this controller allows the display characteristics and supported functions to be changed through reconfigurable hardware and software, allowing a broad range of application in different model automobiles. The controller has electronic circuitry to allow it to be programmed to display monochrome or color graphics and text on an all-points-addressable display device such as a Cathode Ray Tube (CRT) or an Electro-Luminescent (EL) Flat Panel. The display resolution and scan rates may be programmed differently depending on the display type and size. The vehicle operator controls the advanced display system via a reconfigurable switch system (RSS), such as an Infrared Touch Panel or Mylar Touch Switch Matrix mounted over the face of the display. In addition, external discrete switches may also be attached to the controller. The controller includes a master microprocessor and a slave microprocessor and communicates with other parts of the vehicle via two serial data communication links, a Random Access bus and a Poll/Response bus. The use of serial data links and microprocessor based control modules greatly reduces the complexity of the vehicle wiring harness and serves to increase the overall reliability and serviceability of the vehicle. The design uses mostly low power CMOS electronic components which serve to reduce the power dissipation and increase the reliability of the controller.

For a better understanding of the present invention, together with other and further advantages and features thereof, reference is made to the description taken in connection with the accompanying drawings, the scope of the invention being pointed out in the appended claims.

BRIEF DESCRIPTION OF THE DRAWINGS

Referring to the drawings:

FIG. 4 is a diagram that illustrates the interconnection of the display controller with the display unit, touch controller, and switch assemblies.

FIGS. 5A and 5B represent two versions of the display controller one with an interprocessor data link (5A) and the other with integrated RAM arbitration logic (5B).

FIG. 6A represents an internal block diagram of the display controller while

FIGS. 16A and 16B together comprise a flow chart representing the decision process in the 8088 supervisor program.

FIGS. 19A, 19B and 19C are flow charts which represent the decision making in the 8031 supervisor program.

ABBREVIATIONS

Figure 1:
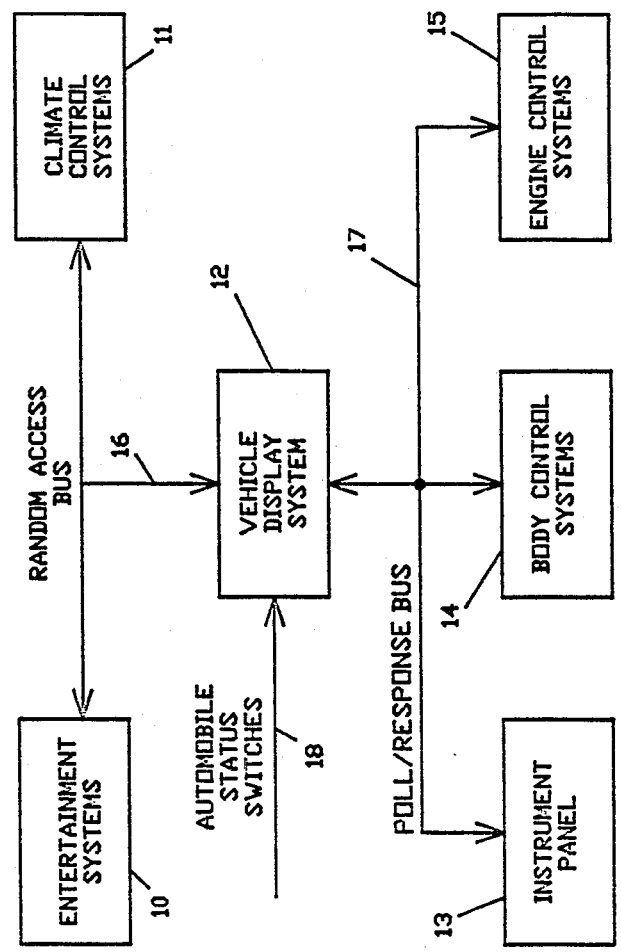
FIG. 1 is a system diagram illustrating the interconnection of the vehicle display system with other elements in the vehicle.

The following abbreviations are occasionally used herein:

| Abbreviations | Definition |
| --- | --- |
| ALE | Address Latch Enable |
| BIOS | Basic Input/Output System |
| CA | Controller Address Bus (8031) |
| CD | Controller Data Bus (8031) |
| C/D | Collision Detection |
| CHA | Controller Address Bus |
| CHAD | Controller Address/Data Bus (8088) |
| CH RDY | Channel Ready |
| CMD | Command |
| CMOS | Complementary Metal Oxide Semiconductor |
| CPU | Central Processing Unit |
| CPUCLK | Central Processing Unit Clock |
| CRT | Cathode Ray Tube |
| CRT DIM IN | Dimming Control line for CRT |
| CXEDRAW | Graphics Language Routines |
| DCS | Display Controller System |
| DEN | Data Bus Enable |
| DMA | Direct Memory Access |
| DI | Digital Input |
| DO | Digital Output |
| DRAM | Dynamic Random Access Memory |
| EPROM | Erasable Programmable Read Only Memory |
| EEROM or EEPROM | Electrically Erasable Read Only Memory |
| GND | Ground |
| HSYNC | Horizontal Synchronization |
| HVAC | Heating, Ventilation, Air Conditioning |
| ID | Identification |
| IGN1 | Ignition Switch 1 |
| IGN2 | Ignition Switch 2 |
| INTA | Interrupt Acknowledge |
| INTR | Interrupt Request |
| IOR | Input/Ouput Read |
| IOW | Input/Output Write |
| MEMR | Memory Read |
| MEMW | Memory Write |
| MSG | Message |
| NMI | Non-Maskable Interrupt |
| OSC | Oscillator |
| PAL | Programmable Array Logic |
| POST | Power On Self Test |
| PWR | Power |
| RAM | Random Access Memory |
| ROM | Read Only Memory |
| RSS | Reconfigurable Switch System |
| RTN | Return |
| SDL | Serial Data Link |
| SIG COND CKTS | Signal Conditioning Circuits |
| $\overline{\text{TCON}}$ | Not Touch Controller On |
| UART | Universal Asynchronous Receiver Transmitter |
| VCC | Logic Voltage (+5) |
| V SYNC | Vertical Synchronization |
| VBAT | Battery Voltage (+12) |
| VBATF | Filtered Battery Voltage |
| VGA | Video Gate Array |
| VKA | Keep Alive Voltage |

The following circuit blocks, including some industry-standard blocks are included in the drawings:

| Block | Function/Description |
| --- | --- |
| 80C88 | Intel* Microprocessor (CMOS) - 8088 |
| 80C31 | Intel Microprocessor (CMOS) - 8031 |
| 80C32 | Intel Microprocessor (CMOS) - 8032 |
| 80C51 | Intel Microprocessor (CMOS) - 8051 |
| 82C55 | Intel Programmable Interface Adapter - 8255 |
| Chip 1 | System Control Chip (CMOS) |

-continued

| Block | Function/Description |
| --- | --- |
| VGA | Video Gate Array |
| RAM Abitration | Co-processor Chip |
| 27C512 | 64K × 8 EPROM |
| 2817A | 2K × 8 EEROM |
| 6264A | 8K × 8 Static RAM (CMOS) |
| 373 | 8 Bit Latch (74HC373) |
| 244 | 8 Bit Receiver/Driver (74HC244) |
| Signal Conditioning Circuits | Translate one voltage level to another, filter out transients |
| 245 | 8 Bit Bus Driver (74HC245) |
| PAL | Programmable Array Logic |
| MISC | Miscellaneous Decode Logic |
| MSM41464 | Video Memory 64K × 4 bits Dynamic RAM |
| 138 | 3 to 8 Decoder (74HC138) |
| 6116 | 2K × 8 Static RAM (CMOS) |
| 27C256 | 32K × 8 EPROM |

*Trademark of Intel Corporation

DETAILED DESCRIPTION OF DISPLAY SYSTEM FOR AUTOMOTIVE VEHICLE

The display system for automotive vehicle and its operation in conjunction with other vehicle elements will now be described.

FIG. 1 is a block diagram of the vehicle display system and other vehicle systems or elements. It comprises an Entertainment systems block 10, Climate Control systems block 11, Vehicle Display system block 12, Instrument Panel block 13, Body Control system block 14 and Engine Control systems block 15. Blocks 10, 11 and 12 are interconnected by way of Random Access bus 16 while blocks 12, 13, 14, and 15 are interconnected by way of a Poll/Response bus 17. Inputs are supplied from automobile status switches by way of bus 18 to block 12.

Entertainment systems block 10 controls the entertainment functions of the vehicle such as the AM/FM stereo radio, cassette player, cellular telephone and compact disk player. The Climate Controls systems block 11 controls the heating, ventilation and air conditioning system of the vehicle. Instrument Panel block 13 controls the display of functions such as the speedometer, engine oil and other associated engine functions. Body Control systems block 14 controls vehicle data such as tie of day clock, trip odometer and trip computer functions. Engine Control systems block 15 controls the operation of the engine and provides information for display on the Instrument Panel block 13 as well as information to the Body Control systems block 14 for use in trip computer calculations. The Vehicle Display system block 12 accepts information via the Poll/Response bus 17 from the Body Control systems block 14 and the Engine Control systems block 15 for display to the vehicle operator. The Vehicle Display system block 12 accepts inputs from the vehicle operator in the form of switch sense and touch sense inputs from automobile status switches bus 18. The Vehicle Display system block 12 also generates commands across the Random Access bus 16 to the Climate Control systems block 11 and Entertainment systems block 10 based on the input from the vehicle operator.

Figure 2:
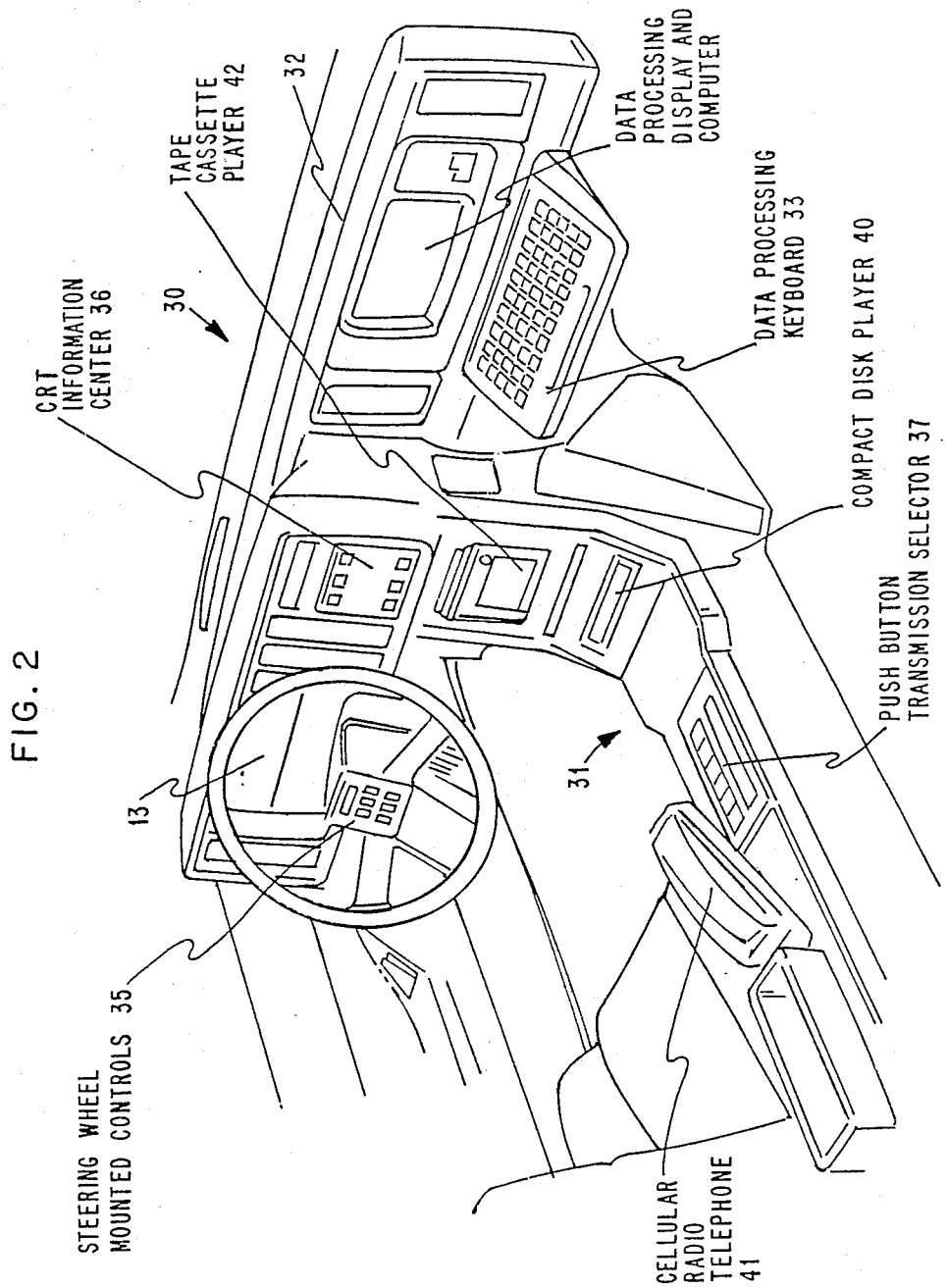
FIG. 2 illustrates the interior of a representative automotive vehicle.

FIG. 2 shows the interior of an automobile with several options. The automobile interior, which is representative of most automobiles, includes a dashboard 30 and console 31 and shows optional features such as a CRT information center 36, data processing display and computer 32, data processing keyboard 33, compact disk player 40, push button transmission selector 37, cellular radio telephone 41, and steering wheel mounted controls 35. The vehicle also has an instrument panel 13. A standard vehicle display system would include the CRT information center 36, and an expanded vehicle display system would include the data processing display and computer 32 as well as the data processing keyboard 33.

Figure 3:
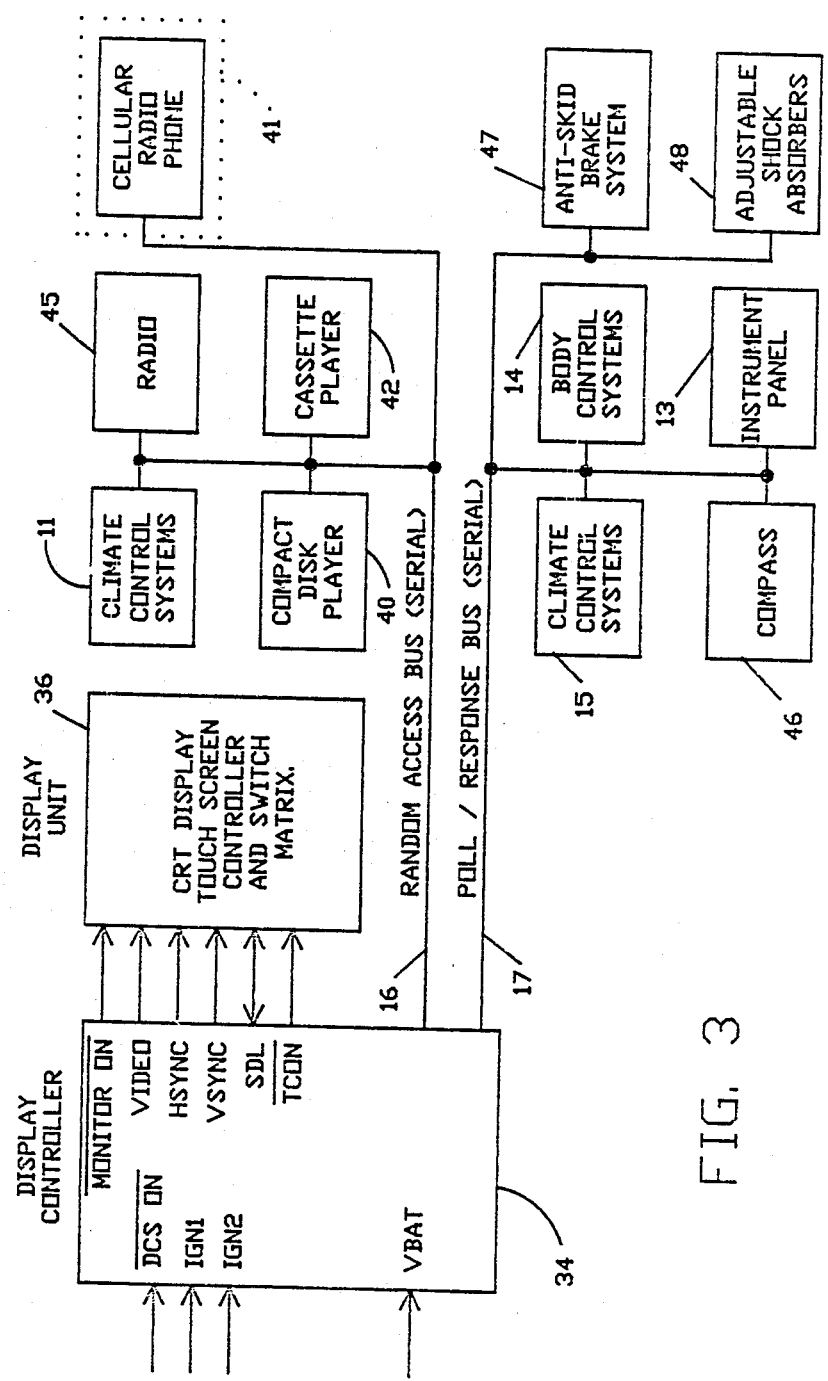
FIG. 3 illustrates the interconnection of the display controller with the display unit and other elements in the vehicle.

FIG. 3 illustrates a Display controller and Display unit in conjunction with the other systems and components of the vehicle. FIG. 3 shows the Display controller 34, Display unit 36, a Climate Controls systems block 11, radio 45, compact disk player 40, cassette player 42, optional cellular radio phone 41, interconnected by way of Random Access bus 16 and Engine Control systems 15, Body Control systems 14, Anti Skid Brake system 47, Adjustable Shock Absorbers 48, instrument panel 13, and compass 46, which are interconnected by way of Poll/Response bus 17. Input signals are used to control the power and operating mode of the controller. Interface signals to external sensors and the touch panel are also provided. Additional details are shown in FIG. 4.

FIG. 4 is comprised of the Display controller 34, the Display block 36a, the touch controller block 36b, and Switch assemblies 36c. Also shown are various interconnecting signal lines between the Display controller, the Touch controller and Display unit. Signals of interest are input signals for power moding control Not DCS on, IGN1 and IGN2. The Not DCS on input controls the power on and power off sequencing of the vehicle display system. The IGN1 and IGN2 signals control the moding of the system such as, run, crank and accessory modes. Other signals of interest are the Not Monitor On line between the Display controller 34 and Display 36a as well as the Video signal, Horizontal sync signal, and Vertical sync signal. Signals of interest between the Display controller 34 and Touch controller 36b are the SDL, Serial Data Link signal and TCON, Touch Controller ON signal. These signals control the Touch controller power on and off and the reporting of Touch inputs from the vehicle operator through the Touch controller to the Display controller 34 via the Serial Data Link, SDL.

Figure 5B:
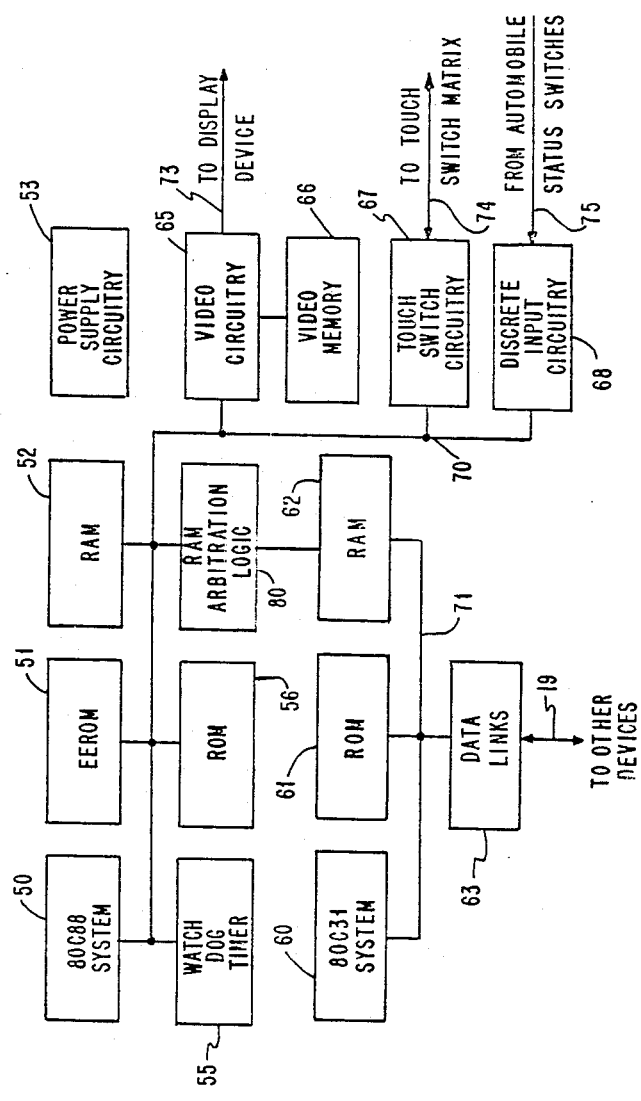

FIGS. 5A and 5B represent two versions of the Display controller and include similar elements with several exceptions. Referring to FIG. 5A the Display controller, version 1, includes an 80C88 microprocessor system 50, EEROM 51, RAM 52, and power supply circuitry 53. It also includes a watchdog timer 55, ROM 56, 82C55 Interprocessor Data Link 57. Connected to the data link 57 by way of bus 71 is an 80C31 system block 60, ROM 61, RAM 62, and data links 63 which communicate with other devices via bus 19. Connected to blocks 50-52 and 55-57 by way of bus 70 are the Video circuitry block 65 with associated bus 73 and Video memory 66 as well as a Touch Switch circuitry block 67, associated Touch Switch matrix bus 74 and a Discrete Input circuitry block 68 with a status switch bus 75. In FIG. 5B, most of the elements shown in FIG. 5A are repeated with the exception that the Interprocessor Data Link block 57 in FIG. 5A is replaced with a RAM Arbitration logic block 80. The various blocks in FIGS. 5A and 5B including the Interprocessor Data Link block 57 and RAM Arbitration logic block 80 ar described in detail later.

Figure 6B:
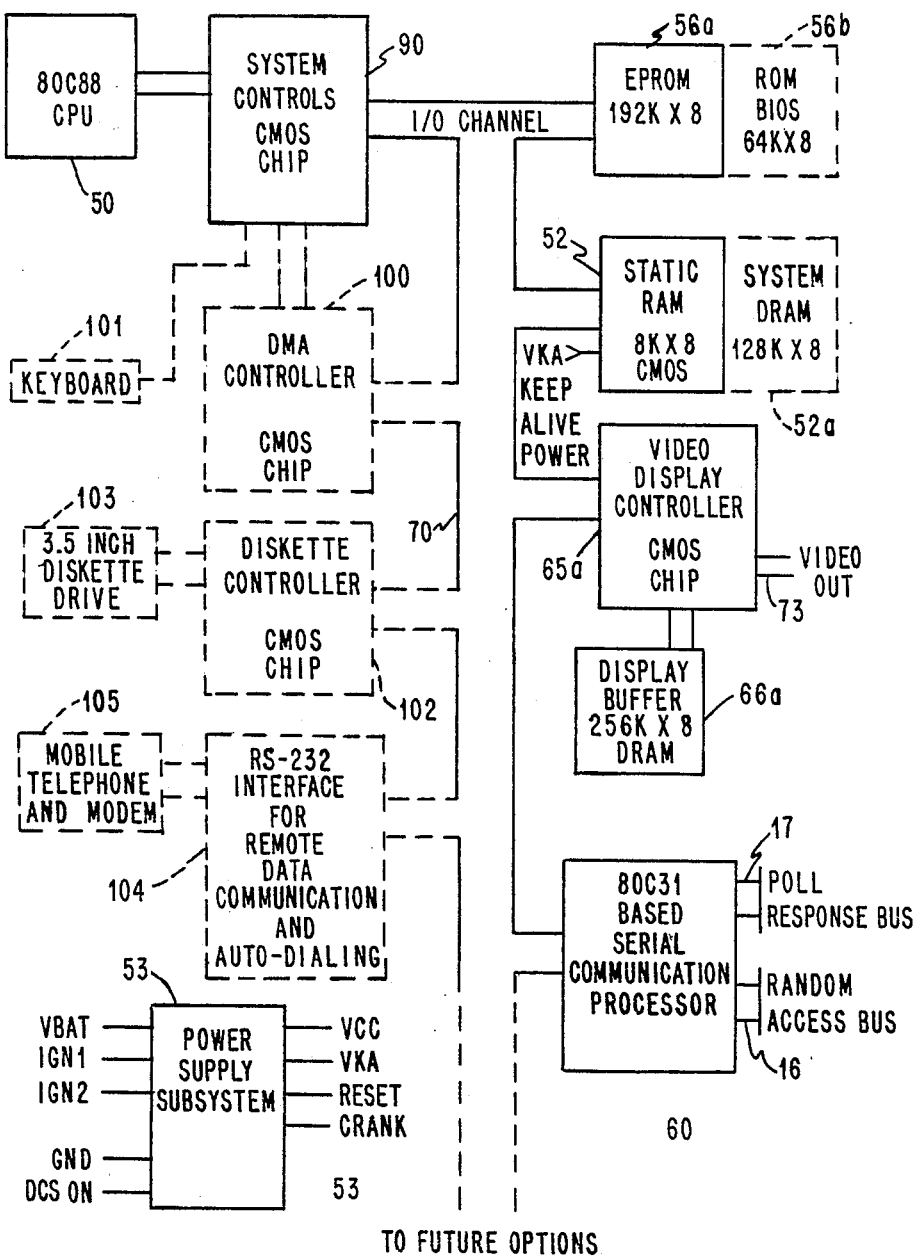
FIG. 6B is a block diagram of an expanded display controller.

FIGS. 6A and 6B show two similar block diagrams of the Display controller. FIG. 6A shows a standard Display controller and FIG. 6B shows an expanded Display controller. Shown in FIG. 6A is the 80C88 processor (master microprocessor) 50, systems controls chip 90, EPROM 56A, which is similar to block 56 shown in FIGS. 5A and 5B. Also shown is touch Reconfigurable Switch System (RSS), miscellaneous I/O block 69, static RAM block 52, and EEPROM block 51a, similar to block 51 in FIGS. 5A and 5B. Also shown is Video Display controller block 65a and output bus 73, and display buffer 66a attached to video Display controller 65a. The 80C31 serial communication processor (slave microprocessor) block 60 is attached to the Poll/Response bus 17 and Random Access bus 16. Also shown is power supply subsystem block 53 and I/O channel bus 70. FIG. 6B shows an expanded system with additional function. Added are ROM, Basic Input/Output System (BIOS) block 56a, System DRAM block 52a, DMA controller block 100, keyboard block 101, Diskette controller block 102, Diskette Drive block 103, RS232 interface block 104 and Mobile Telephone and Modem block 105. The expanded system allows additional functions such as On-vehicle dat processing and data communication with remote data bases.

Figure 7A:
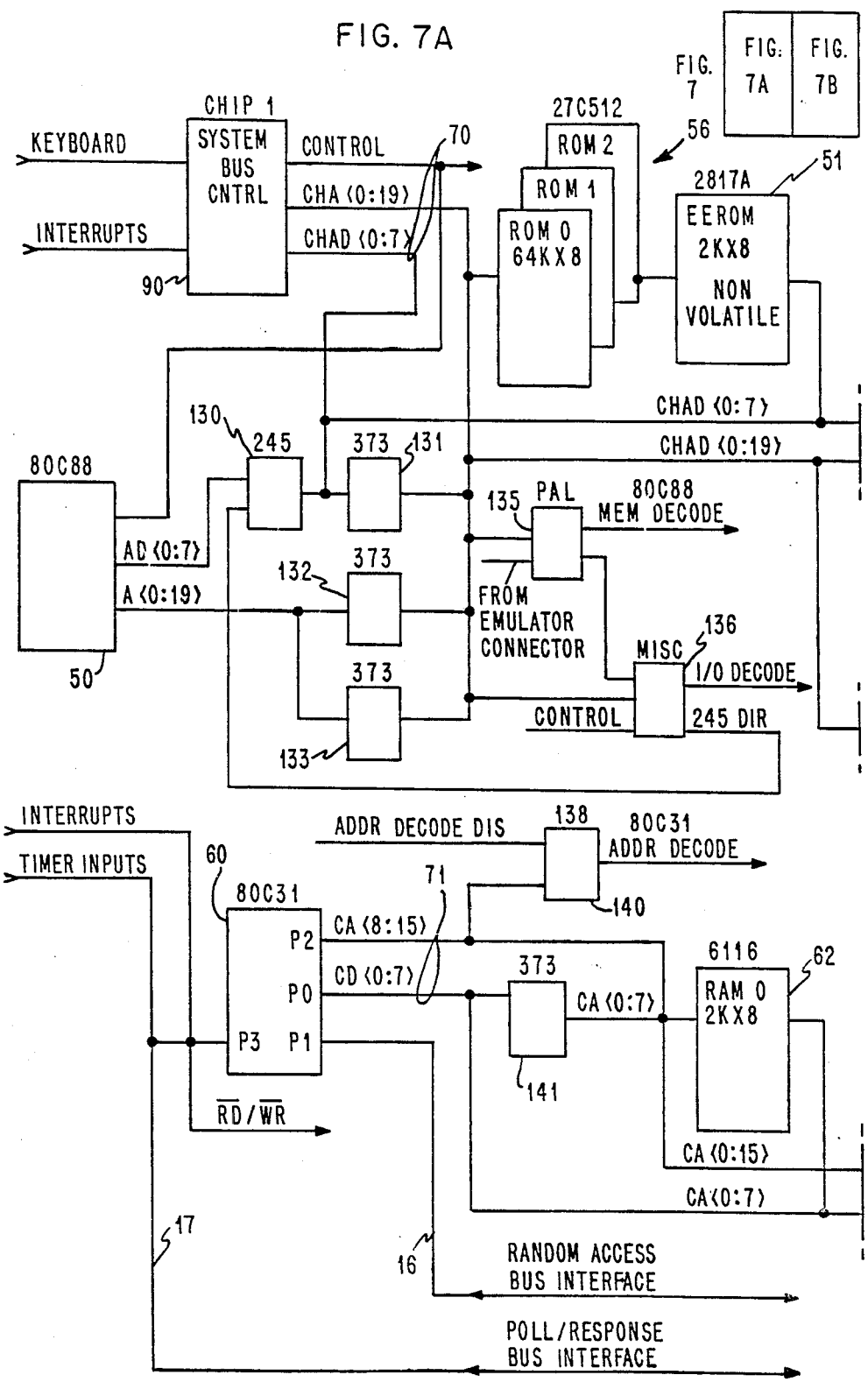
FIG. 7 is a more detailed diagram of the elements comprising the display controller and related interface circuits.
Figure 7B:
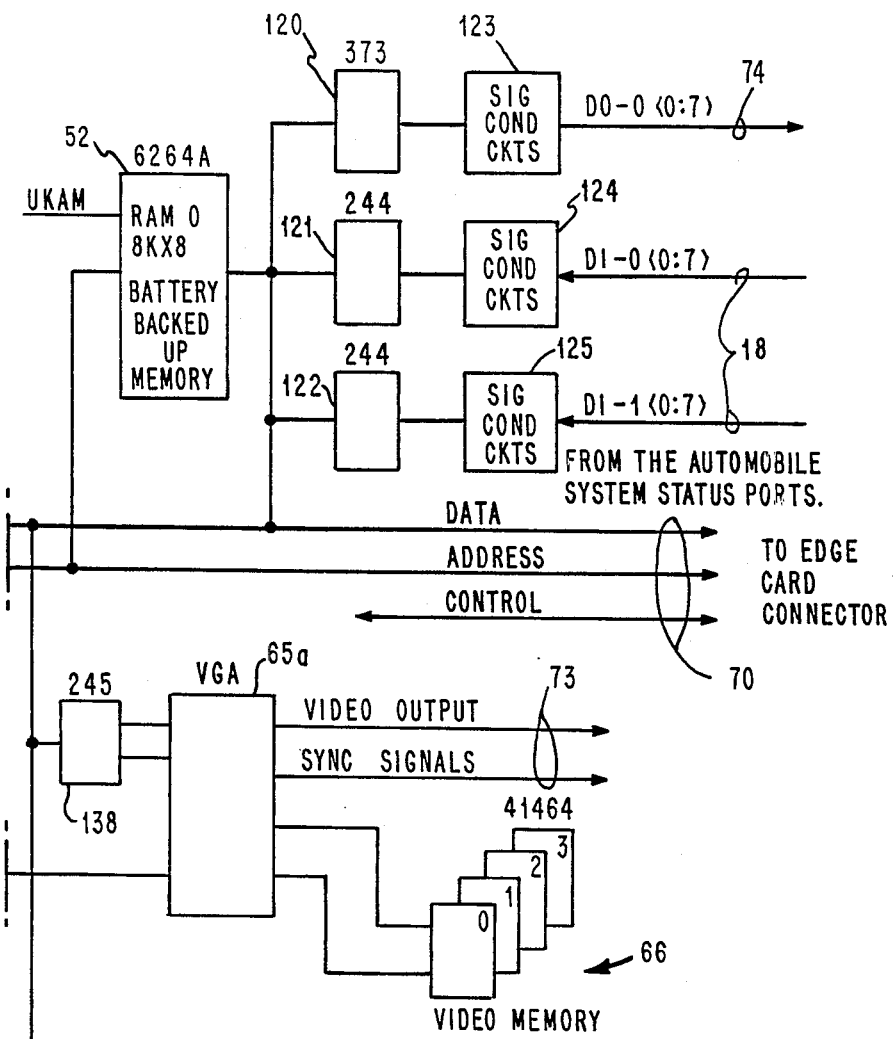

FIG. 7 is a more detailed diagram of the Display controller. The controller design makes use of two microprocessors: an 80C88 (8088) microprocessor 50 serves as the master microprocessor and an 80C31 (8031) microprocessor 60 serves as a slave communications microprocessor. Each microprocessor has its own address latching and decode circuitry, comprised of blocks 131, 132 and 133 for the 8088 microprocessor and blocks 140 and 141 for the 8031 microprocessor. Other elements include blocks 135 and 136 for the 8088 decode circuitry. TThe System Bus controller 90 is a CMOS logic device which serves as the system clock generator, bus controller, and interrupt controller. It produces the standard 8088 bus control signals based on the S0, S1, S2 signals from the 8088. It also handles external interrupt requests and generates the 8088 clock signal. The System Bus controller also has provisions for attachment of an external keyboard. Another CMOS logic device, the Video Gate Array (VGA) 65a, is controlled by the 8088 to provide the display of graphics and text on the attached display device. The VGA is a general purpose video controller which may be configured via software to support various types of all-points-addressable display devices with variable resolutions and scan rates. The VGA controls either 64K or 256K bytes of video memory 66 which is directly addressable by the 8088. The video memory is configured as four bit planes, each containing 16K or 64K bytes of RAM depending on the maximum desired resolution. The six outputs generated by the VGA 65a are used to supply the picture and synchronization signals to the display device. Both the 8088 and 8031 microprocessors have their own independent memory address spaces. The 8088 control program is stored in the Read Only Memory (ROM) device 56. The 8088 also has a low power RAM Memory 52 which is always kept active by the vehicle's battery. Information which is to be retained when the vehicle is not in use, such as radio status, climate system setting, and trip monitor status are kept in this memory. A checksum algorithm is used to verify the validity of the data in the RAM. If the battery is disconnected, the contents of the RAM will be lost. At the next power on time the RAM will be initialized to the system default values. The parts of the RAM not used for this type of information are used as workspace for the control program stored in ROM. A non-volatile storage device EEPROM 51 is also provided to allow the 8088 to permanently store critical information such as the phone directory data, appointment calendar information, and service log information. This information is not lost if the battery is disconnected. The 8031 is provided with a ROM 61 for control program storage as well as a RAM 62 for communication buffer space and control program workspace. Communication between the 8088 and the 8031 is provided by the Interprocessor Data Link 57 composed of 82C55 (8255) programmable peripheral interface 145 and the associated bus driver circuits 146 and 147.

Communication with the world outside the Display controller is accomplished through the discrete inputs and outputs connected to the 8088 bus as well as through the two serial data links which are connected to the 8031. All external inputs and outputs have appropriate signal conditioning and transient suppression circuitry to guarantee proper operation in the automotive environment. The discrete inputs and outputs 18 and 74 are used by the 8088 to receive touch switch information, determine the proper operating mode, and control the power to the attached display device. The Universal Asynchronous Receiver/Transmitter (UART) included in the 8031 microprocessor is programmed to perform as a slave device on the Poll/Response bus 17. Through this bus the display controller monitors and controls the operation of devices such as the Engine Control system, Body Control system, Instrument Panel, etc. The Random Access bus is also connected to the 8031. This link operates at 1K BAUD and is a contention bus. The 8031 uses one of its external interrupt inputs to detect the start of a bit on the Random Access bus and to provide a link sampling input to the 8031. The 8031 uses one of its internal timers to guarantee the sampling of each received data bit at the proper time. Transmission of data on the Random Access bus 17 is controlled and monitored by the 8031 via its control program and the 8031 integrated input/output ports.

The display controller architecture reduces the number of different Programmable Read only Memories (PROM's) required for a multi-microprocessor system. As noted, the Display controller has two microprocessors, one to control system operations, standard I/O and Display controls, the second to control two serial communication links that interface with other subsystems. The second microprocessor in this controller heretofore has had two PROM's (or ROM's) to define its operation. It is desirable that controllers be used for different car model applications, but each application would require two unique PROM's to personalize performance. The architecture herein described reduces personalization to a single PROM. In the protocol architecture between the master and the slave microprocessors only one ROM 56 contains the personality of the vehicle platform. The ROM 61 for the slave microprocessor becomes generic regardless of changes to the command/ response structure of the specific bus.

Figure 8:
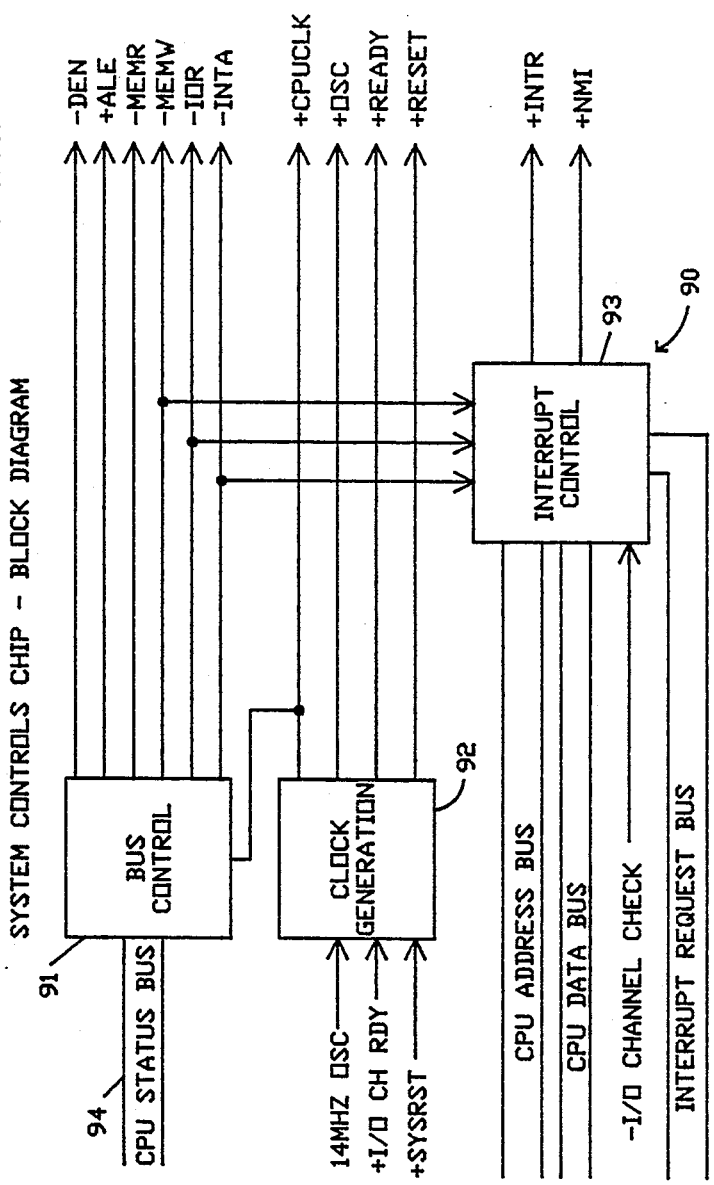
FIG. 8 is block diagram illustrating the systems control chip for the display controller.

FIG. 8 is a block diagram of the System Controls chip. Internal elements include the Bus Control block 91, clock generation block 92, Interrupt Control block 93, and a CPU status bus 94. A variety of command, address and data signal lines is shown. Bus control block 91 accepts inputs from the 8088 CPU Status Bus 94 which determines the activation of the control signal outputs to the system bus. Clock generation block 92 generates the system bus Clock, Reset, and Memory ready signals based on the 14 MHz oscillator, I/O Channel Ready, and System Reset inputs. Interrupt Control block 93 generates the 8088 CPU Interrupt Request Signals INTR and NMI based upon the Interrupt Request bus inputs, I/O Channel Check input, and the state of the internal interrupt enable and priority registers. The interrrupt enable and priority registers are set via the CPU address and data bus inputs to the Interrupt Control block 93.

Figure 9:
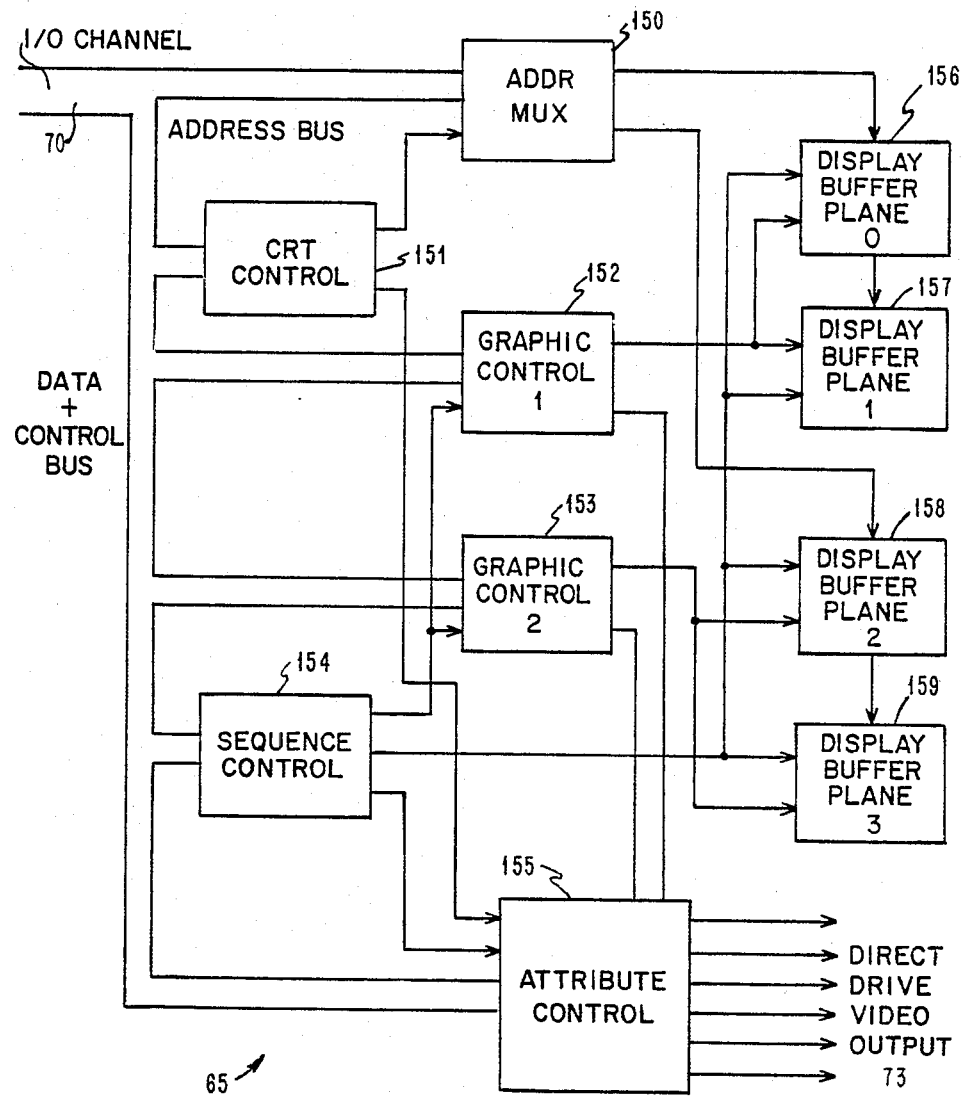
FIG. 9 is a block diagram of a video gate array VGA that is useful in the display controller system.

FIG. 9 is a block diagram showing the internal connections of the Video Gate Array (VGA) chip 65a. Internal blocks include Address Multiplexer block 150, CRT control block 151, Graphic control 1 block 152, Graphic control 2 block 153, Sequence control block 154, and Attribute control block 155. Other blocks include the four display buffer bit planes 0, 1, 2 and 3 shown as blocks 156, 157, 158, and 159 respectively. Inputs to the VGA chip are by way of the I/O channel 70 and outputs to the display device are via the video output 73

The Address Multiplexer block 150 serves to select the source of the address signals which drive the display buffer bit planes. During normal display refresh, the address generated by the CRT control block 151 is selected by the Address Multiplexer block 150 to the control display buffer address. When the display buffer information (picture) is being changed by the 8088 CPU, the Address Multiplexer block 150 selects the CPU provided address from the I/O Channel 70 to drive the display buffer planes. The CRT control block 151 controls the display refresh and synchronization signal generation. The Sequence control block 150 controls the display buffer access and video signal timings. Graphic control blocks 152 and 153 control the mapping of the display buffer data into actual picture elements (PIXELS). This mapping is dependent upon control register values which may be changed via I/O Channel 70. Attribute control block 155 controls the display attributes such as blinking, underline, and high/low intensity when character display modes are selected.

Figure 10:
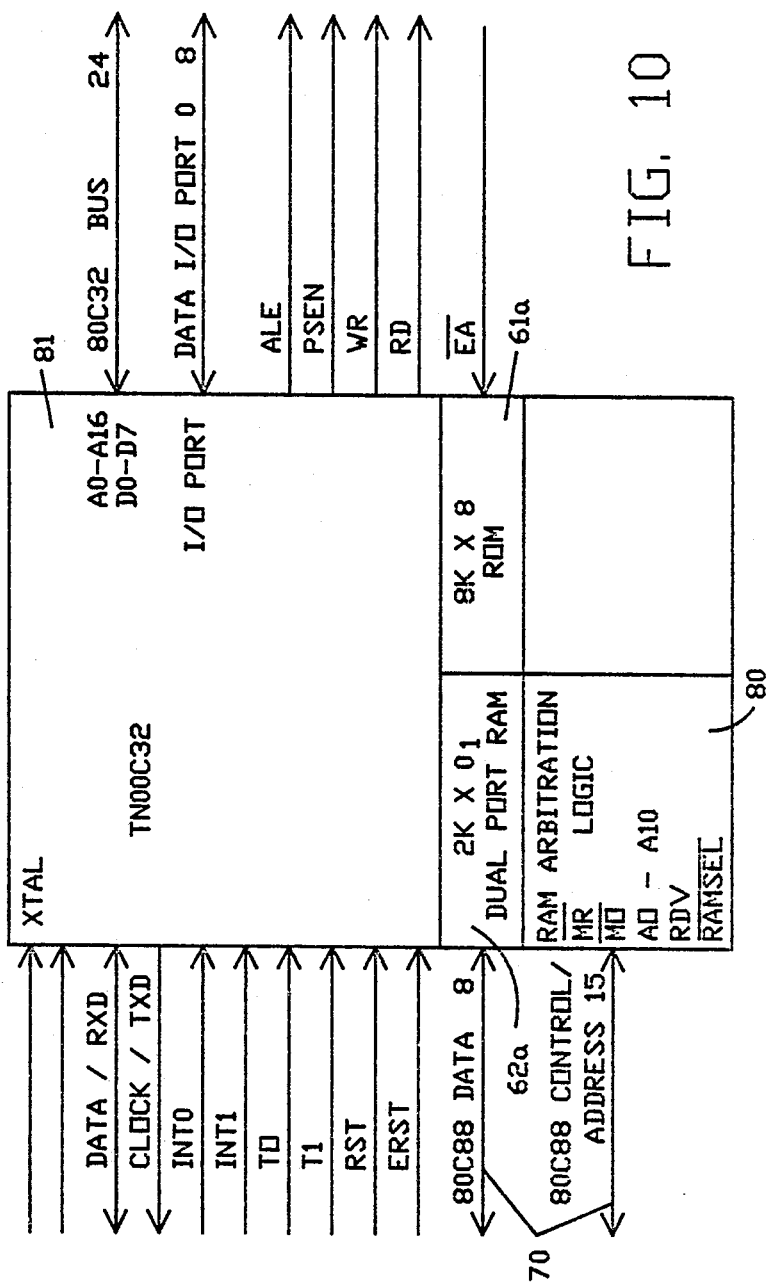
FIG. 10 illustrates a microprocessor with integrated RAM arbitration logic that is shown as a portion of FIG. 5B.

FIG. 10 is a diagram of the integrated RAM arbitration logic used in conjunction with the 8031 microprocessor as shown in FIG. 5B, version 2 of the Display controller, except that in FIG. 10 the 8031 microprocessor has been replaced with an 80C32 microprocessor which has one added hardware timer. Integrated onto the single chip is a 2K dual port RAM block 62a, 8K ROM block 61a and the RAM arbitration logic block 80. This implementation of the Display controller allows commands and data to be passed between the 80C88 and 8031 processors more rapidly than that of version 1 which uses the 80C55 as an interprocessor data link. The RAM Arbitration logic allows both the 8032 and 8088 processors to share the 2K RAM block 62A. The RAM Arbitration logic block 80 handles Requests from both the 8032 and 8088 CPUs for shared data and determines which CPU is allowed to access the RAM. If Requests for access occur simultaneously from both CPUs, the 8032 is given priority and the 8088 access is delayed by bringing the 8088 Memory Ready control signal low until the 8032 access is completed. Without the RAM arbitration logic block 80, all data which is to be shared by the two processors must be passed under direct program control via an interprocessor data link which requires complete cooperation of both processors.

Figure 11A:
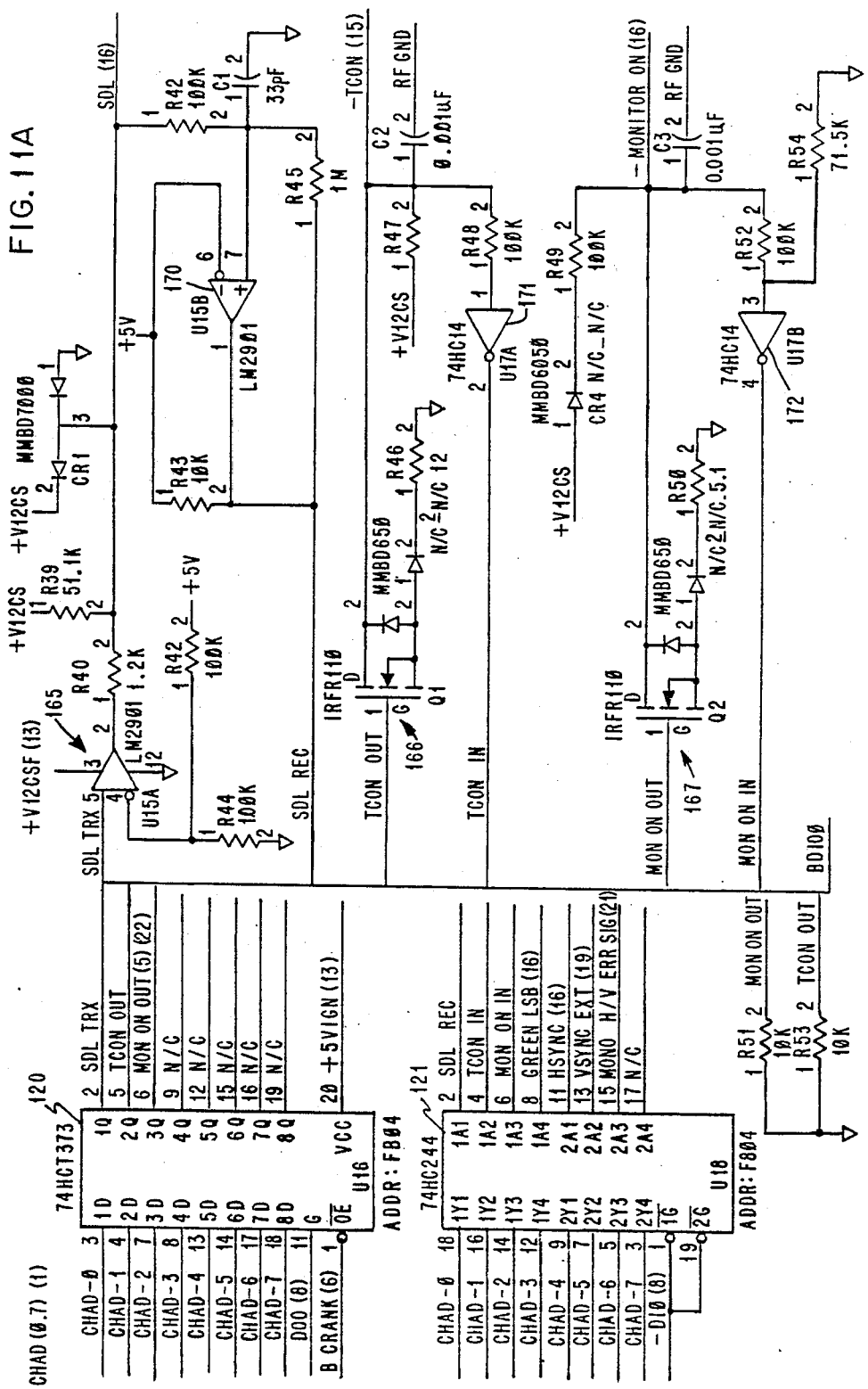
FIGS. 11A and 11B illustrate digital Input/Output and signal conditioning circuits that are useful in the system described herein.
Figure 11B:
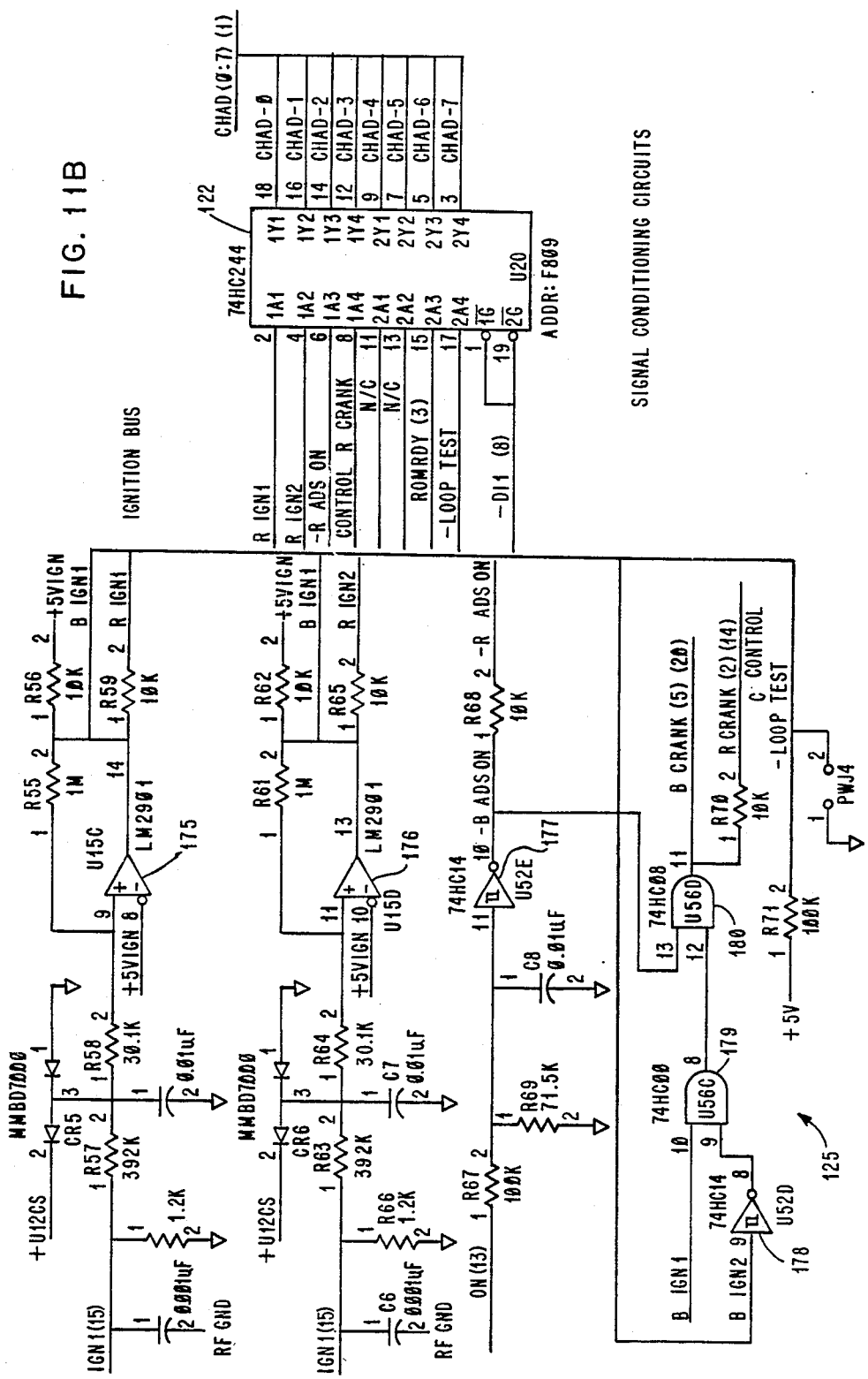

FIGS. 11A and 11B show further detail of blocks 120-125 in FIG. 7. The driver circuit blocks 165-167 for the output signals SDL, TCON, and Monitor ON are shown as well as the input wrapback receiver blocks 170-172 on FIG. 11A. FIG. 11B shows input receiver circuits 175-177 for the IGN1, IGN2, and DCS ON signals. Also shown is the crank detection logic blocks 178-180. Miscellaneous resistors, capacitors, and diodes serve as signal conditioning and transient protection components.

An example of FIG. 11A circuit operation, assume it is desired to bring the TCON output low and the Monitor ON and SDL outputs high. The control program then sets the bit in register AL which corresponds to the SDL control bit (bit 0) and TCON output (bit 1) to a logic one and resets the Monitor ON control bit (bit 2) to a zero. This value of register AL is then sent to the Output Port latch block 120 via an OUT instruction and activates the latch block 120 gate input to force the latch to retain the output data value. This new data forces the TCON transistor driver 166 to turn on thus pulling the TCON output low through resistor R46. Also, transistor driver 167 is turned off and the monitor ON output is pulled to 12 volts through resistor R39 since the SDL driver block 165 would be floating due to the input being at a higher voltage than the reference voltage of 2.5 volts created by voltage divider resistors R42 and R44. The current state of the SDL, TCON, and monitor ON signals may be read at any time by the 8088 CPU via receiver circuits 170-172 and Input Port block 121.

FIG. 11B operates in a manner similar to that of the input circuits of Fig. lIA but for the IGN1, IGN2, and DCS ON signals. Receivers 175-177 serve to convert the 12 volt signals to 5 volt logic levels and pass them to the input port block 122 where they may be sampled by the 8088 CPU. Logic circuits 178-180 serve to detect the presence of a vehicle cranking condition and to produce a CRANK signal which will alert the 8088 CPU of the condition via an interrupt. The 8088 CPU must perform a sequenced shutdown procedure to save critical data in the Keep Alive RAM prior to the activation of the vehicle starter motor. A valid crank condition is detected by the logic when the IGN1 input is high, the IGN2 input is low, and the DCS ON input is high.

Figure 12:
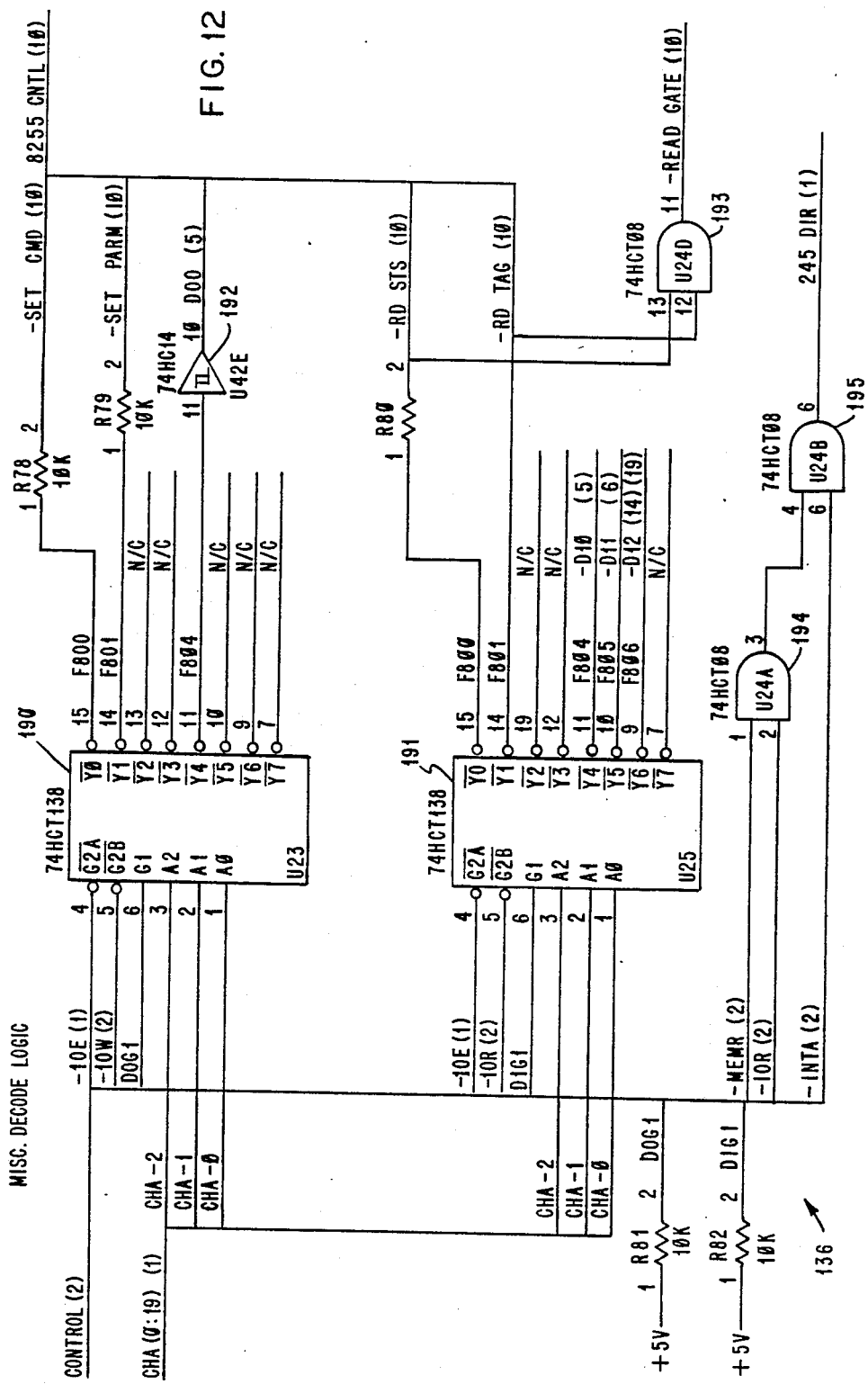
FIG. 12 illustrates miscellaneous decode logic that is used in the system described herein.

FIG. 12 shows additional details of miscellaneous decode logic shown as block 136 of FIG. 7. Blocks in FIG. 12 include two decoder circuit blocks 190 and 191 as well as miscellaneous blocks 192-195.

FIG. 12 ultilizes two 3 to 8 decoder blocks 190 and 191 to produce various input and output control signals. The appropriate control signals are activated depending upon the various address and enable inputs. The SET CMD and SET PARM signals are low active and correspond to the 8088 CPU OUT instruction to port addresses F800 hexadecimal (HEX) and F801 HEX respectively. The DO0 signal is converted to an active high signal by inverter block 192 and corresponds to the 8088 CPU OUT to port F804 HEX. Likewise, the RD STS and RD TAG signals are low active and correspond to the 8088 CPU IN instruction to ports F800 hexadecimal (HEX) and F801 HEX respectively. Additional input control signals D10, D11, and D12 correspond to port addresses F804, F805, F806 respectively. Another control signal, READ GATE is derived from the R STS and RD TAG signals by AND gate block 193 and is active low when either of the RD STS or RD TAG signals is low. AND gate blocks 194 and 195 bring the 8088 data bus direction control signal 245 DIR low if either the MEMR, IOR, or INTA signals go low.

Features of the present system include dual microprocessor architecture, programmable display, programmable display resolution, and programmable serial communication protocol. For example, the present system differs from the system described in the Ortega et al article in that the partitioning of functions between the two microprocessors in the present system is different from that described in the article. In the Ortega et al system, the functions are partitioned to have one communication link supported by the master microprocessor and the second communication link supported by the slave microprocessor. The present system partitions functions so that the master microprocessor controls only display and touch handling functions, while the slave microprocessor supports both serial communication links concurrently. In addition, the present system supports a variety of display types, both color and monochrome CRTs as well as electro-luminescent flat panel displays. Additional features include support for different resolution displays as well as different sync frequencies and scan rates. Another feature of the present system allows the slave microprocessor to be programmed by the master processor upon power up of the system to configure the serial communication links (Poll/Response bus and Random Access bus) to handle a variety of protocols and message formats. The programmability of display type and communication formats is accomplished by tables which are loaded into the video gate array for the display programmability and tables loaded into 8031 RA for personalizing the communication link protocols and message formats.

Figure 13:
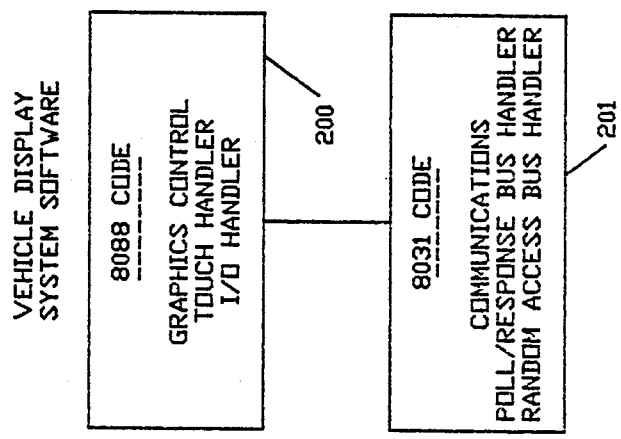
FIG. 13 represents a high level diagram of the vehicle display system software including code for an 8088 microprocessor and an 8031 microprocessor.

FIG. 13 is a high level diagram of the vehicle display system software. High level functions of the 8088 microprocessor control program are shown in block 200. Major functions of the 8031 code are shown in block 201. For the 8088 code, major functions include the graphics control, touch handling, and I/O handling of the system, while the 8031 code controls the communications with the external Poll/Response bus and Random Access bus. Communication between the processors code is controlled by cooperative routines in each microprocessor.

Figure 14:
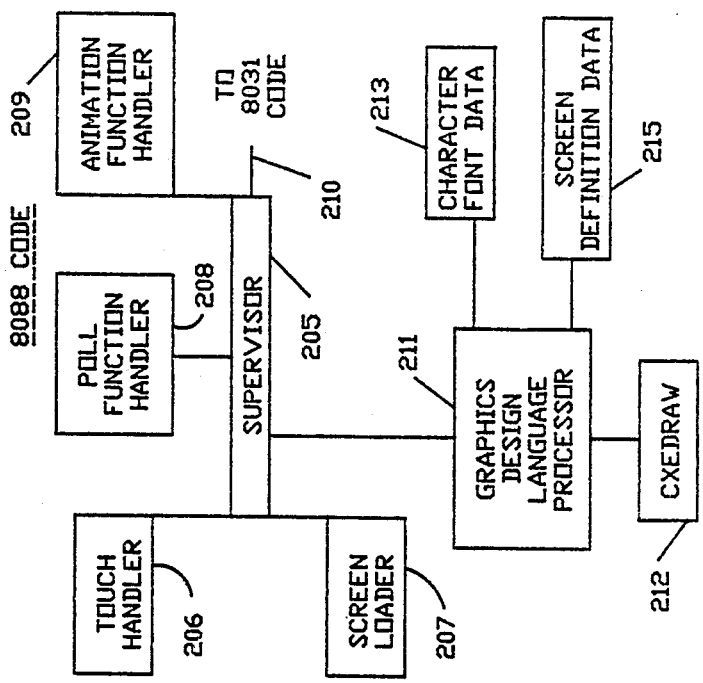
FIG. 14 is a functional block diagram of the code utilized with the 8088 microprocessor.

FIG. 14 is a diagram detailing the breakdown of function within the 8088 control program. Major functions include the Supervisor block 205, the Touch handler block 206, the Poll Function handler block 208, the Animation Function handler block 209, and the Screen Loader block 207. Additional routines include the interface to the 8031 microprocessor 210, the Graphics Design Language processor block 211, Character Font Data block 213, and Screen Definition Data block 215. Also shown is the CXEDRAW graphics drawing routines block 212. It should be noted that block 215 Screen Definition Data, and block 213, Character Font data, are not executable code but are used by the code to draw and manipulate the screen graphics.

Figure 15:
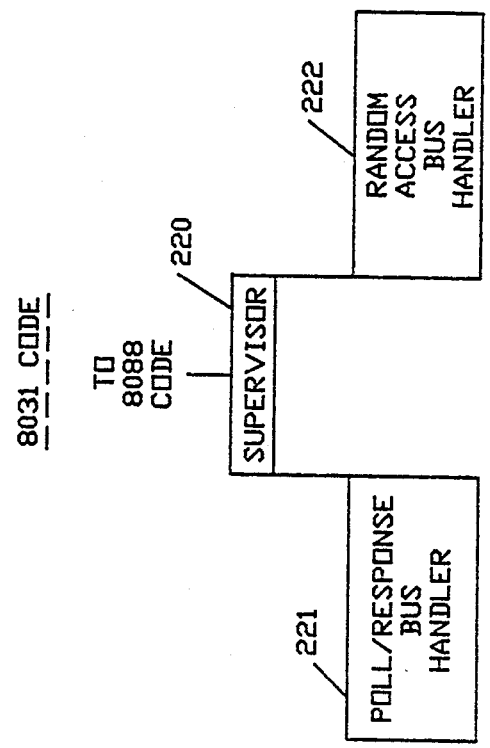
FIG. 15 is comparable to FIG. 14 but represents a functional block diagram of the 8031 code.

FIG. 15 is a diagram of the 8031 control program components. Items include the Supervisor program block 220, the Poll/Response bus handler block 221, and the Random Access bus handler block 222. Additional routines support interfacing and data passing to the 8088 routines.

Other details concerning a representative software architecture for the 8088 and 8031 microprocessors are set forth below.

8088 code

* Supervisor
Handles Power Moding (Crank, Run, Accessory Modes)
Performs RAS functions (Post, Background Diags., Error Log)
Scans Switch Matrix
Gets vehicle messages from 8031 processor.
Translates vehicle link messages into standard formats.
Builds response messages and sends them to the 8031.

* Screen Loader
Draws static screen graphics
Initializes dynamic screen graphics
Initializes animation sequences
Initializes polling functions

* Graphic Design Language Processor
Graphic design language interpreter
Breaks down GDL statements into graphic primitives
Formats CXEDRAW control block
Calls CXEDRAW for graphic primitive drawing

* CXEDRAW
Draws graphic primitives
Supports Enhanced Graphics Adapter (VGA)
Developed by Yorktown Research

* Touch Function Handler
Switches numbers passed from Supervisor
Performs function lookup into Touch Table for active screen.
Performs desired function

* Poll Function Handler
Gets next polling function from active screen poll table
Performs desired polling function
Updates poll table pointer for next poll time

* Animation Function Handler
Sequences through animation table

8088 Memory Map

Memory Type
8K×8 Static CMOS RAM (variable data storage—kept alive by vehicle battery)
2K×8 EEPROM (permanent memory for memo calendar and phone directory data)
256K×8 Dynamic RAM (8-64K×4 chips) (video buffers)
192K×8 CMOS EPROM (3-64K×8 chips) (control program and screen data)

| Address Range | Usage | Memory Type |
|---|---|---|
| 00000-01FFF | Variable Data Storage | Static RAM |
| 90000-907FF | Memo Calendar/Phone Directory | EEPROM |
| A0000-AFFFF | Video Buffers | Dynamic RAM |
| D0000-DFFFF | Screen Data | EPROM 1 |
| E0000-EFFFF | Screen Data/Font Data | EPROM 2 |
| F0000-FFFFF | Control Program Storage | EPROM 3 |

*Note: User must use MAP Mask Register to select between four bit planes.

8088 I/O MAP

-continued

| Address Range | Usage |
| --- | --- |
| 20-21 | Interrupt Controller* |
| 60 | Keyboard* |
| 61-62 | NMI Control* |
| 72 | Clock Control* |
| 7C | Feature Control* |
| 7F | Power Control* |
| A0 | Channel Control* |
| A1-A3 | Manufacturing Test (Decoded by Tester) |
| 3B4-3B5 | Video CRT Controller Regs. (Mono) % |
| 3BA | Video Feature Control/Input #2 (Mono) % |
| 3C0 | Vidoe Attribute Control Regs. % |
| 3C2 | Video Miscellaneous I/O #1 % |
| 3C4-3C5 | Video Sequencer Regs. % |
| 3CE-3CF | Video Graphics Control Regs. % |
| 3C4-3D5 | Video CRT Controller Regs. (Color) % |
| 3DA | Video Feature Controll/Input #2 (Color) % |
| F800-F809 | Interprocessor Communication Ports |
| F808-F809 | Digital Input/Digital Output Ports |
| F800 | Watch Dog Timer Reset Port |

*Decoded internal to System Controls chip
% Decoded internal to VGA chip

8031 Code

\* Supervisor
Handles commands from 8088
Performs RAS functions (Post, Background Diags., Error Log)

\* UART Handler
Monitors Vehicle Poll/Response Bus
Saves Messages as requested by 8088
Transmits response messages supplied by 8088
Handles bus contention (hardware collision detect)

\* Random Access Bus Handler
Monitors vehicle random access bus
Saves status from received messages
Transmits messages as requested by 8088
Handles bus contention (Hardware Collision Detect)

8031 Memory—I/O MAP

Memory Type
2K×8 Static CMOS RAM (Variable Data Storage)
32K×8 CMOS EPROM (Control Program Storage)

I/O Type
Built in UART—Full Duplex Asynchronous Communication Port (used for communication to Poll/Response Serial bus)
Port 1—Built in to 8031 (8-Bits) (Used for communication to Random Access Serial bus)
8255—Programmable I/O Port (two 8-Bit ports with handshake logic) (used for 8088/8031 interprocessor communications)

| Address Range | Usage | Memory Type |
| --- | --- | --- |
| 0000-7FFF | Control Program | EPROM |
| 8000-8003 | Interprocessor Communications | 8255 I/O Port |
| E000-E7FF | Variable Data Storage | Static RAM |

Communication between the master microprocessor 50 and the slave microprocessor 60 is that of a Command/Response nature. For example, when the need to update the driver display is realized the master microprocessor 50 sends a Read command to the slave microprocessor 60 indicating the message ID to be read. In order to realize the objective of making the ROM 61 generic, two extra commands are added to the library of commands between the master and the slave microprocessor. These commands are "Load Message ID table" (LMIDT) and "Load Message Response table" (LMRST). These two commands are issued by the master on power up after the self test by both microprocessors. The LMIDT command loads a table of all the bus message ID's that the slave microprocessor must save for that particular vehicle.

The format of the message ID's is as follows:
M1ID,M1LN,M1ADH,M1ADL,M1STS,- M2ID,M2LN ... MnID,MnLN ... MnSTS,CMDEND
Where:
M1ID is the ID of message 1 to be saved
M1LN is the length (number of bytes of data) of message 1
M1ADH is the high byte of the 8031 RAM address where message data is to be saved.
M1ADL is the low byte of the RAM address.
M1STS is message 1 status byte
CMDEND indicates end of table transmission
Similarly, the LMRST command loads a table in the slave microprocessor of all the message ID's that the slave must respond to for that particular vehicle.

Following are details of the formats and examples of Tables utilized in the 8088 and 8031 microprocessors:

8031 MESSAGE TABLE FORMAT

| ID BYTE 1 | MESSAGE LENGTH BYTE | 8031 RAM ADDRESS WORD | STATUS BYTE |
| --- | --- | --- | --- |
| ID BYTE 2 | MESSAGE LENGTH BYTE | 8031 RAM ADDRESS WORD | STATUS BYTE |
| . | . | . | . |
| . | . | . | . |
| ID BYTE N | MESSAGE LENGTH BYTE | 8031 RAM ADDRESS WORD | STATUS BYTE |

SAMPLE 8031 MESSAGE ID TABLE FROM 8088 CODE

```
DB    12H,4+55H,0E0H,080H,80H
DB    30H,9+55H,0E0H,090H,80H
DB    31H,16+55H,0E0H,0A0H,80H
```

```
          DB      32H,0+55H,0E0H,0B8H,80H
          DB      33H,4+55H,0E0H,0C0H,80H
          DB      34H,0+55H,0E0H,0C8H,80H
          DB      37H,20+55H,0E0H,0D8H,80H
          DB      61H,2+55H,0E0H,0F0H,80H
          DB      20H,3+55H,0E0H,0F8H,80H
          DB      21H,15+55H,0E1H,000H,80H

SAMPLE 8031 MESSAGE RESPONSE TABLE FROM 8088 CODE

DB      12H,3+55H,0E2H,00H,01H
          DB      30H,2+55H,0E2H,10H,01H
          DB      31H,1+55H,0E2H,20H,01H
          DB      32H,6+55H,0E2H,30H,01H
          DB      33H,0+55H,0E2H,40H,01H
          DB      34H,2+55H,0E2H,50H,01H
          DB      37H,4+55H,0E2H,70H,01H

VIDEO GRAPHICS ARRAY INITIALIZE TABLE FORMAT
```

| HARDWARE PROFILE DATA |
| --- |
| VIDEO SEQUENCER REGISTER DATA |
| CRT CONTROLLER REGISTER DATA |
| ATTRIBUTE CONTROL REGISTER DATA |
| GRAPHICS CONTROL REGISTER DATA |
| VIDEO BUFFER PAGE DEFINITION DATA |

```
        SAMPLE VIDEO GRAPHICS ARRAY INITIALIZE TABLE FROM 8088 CODE

CXETABL LABEL   BYTE

; hardware profile table
    DB      06Dh,04Fh,0E4h,065h
    DW      3
    DW      offset mpms - offset CXETABL
    DW      offset CXETEND - offset CXETABL
    DB      000h
    DB      003h
    DW      2                           ;NUMBER OF PAGES
    DW      0
    DW      offset pgts - offset CXETABL
    DB      010h,0                      ; crtc overflow register
    DW      320,200
    DW      250
    DB      06Eh,000h ; --- sequencer parameters
mpms    equ     $
    DB      5                           ; type 5 = word out
    DW      03C4h                       ; 0 -> 3C4 (seq)
    DB      00h,001h                    ; addr/data DB      005h                        ; type 5 = word out
    DW      03C4h                       ; -> 3C4 (seq)
    DB      001h,00Bh                   ; addr/data DB      1                           ; type 1 = byte out
    DW      03C2h                       ; -> 3C2 (misc)
    DB      0A3h                        ; byte value
```

```
        DB      1                               ; type 1 = byte out
        DW      03DAh                           ; -> 3DA (FEATURE CONTROL)
        DB      00Ch                            ; byte value DB      2                               ; type 2 = indexed port
        DW      03C4h                           ; -> 3C4 (seq)
        DW      3                               ; 3 registers
        DB      002h                            ; 1st reg = 2
        DB      00Fh,000h,006h                  ; byte values ; restarting sequencer
        DB      5                               ; tye 5 = word out
        DW      03C4h                           ; -> 3C4 (seq)
        DB      000h,003h                       ; addr/data
; load crt controller
        DB      002h                            ; type 2 = indexed port
        DW      03D4h                           ; -> 3D4 (crtc)
        DW      0019h                           ; 25 registers
        DB      000h                            ; 1st reg = 00
        DB      034h,027h
        DB      02Dh,014h,02Eh,014h,0DBh,010h,000h,000h  ;NEW VGA PARMS (72HZ)
        DB      000h,000h,000h,000h,000h,000h,0D5h,020h
        DB      0C7h,014h,000h,0D8h,019h,0E3h,0FFh
; reset attribute latch register
        DB      4                               ; type 4 = read port
        DW      03DAh                           ; <- 3DA
        DB      0                               ; place holder
; load up attribute chip
        DB      3                               ; type 3 = single port
        DW      03C0h                           ; -> 3C0
        DW      014h                            ; 20 registers
        DB      000h                            ; 1st reg = 00
        DB      000h,001h,002h,003h,004h,005h,006h,017h
        DB      010h,011h,012h,013h,014h,015h,016h,017h
        DB      001h,000h,00Fh,000h
; turn video back on
        DB      1                               ; type 1 = byte out
        DW      03C0h                           ; -> 3C0
        DB      020h
; load graphics
        DB      2                               ; type 2 = indexed port
        DW      03CEh                           ; -> 3CE (grx)
        DW      009h                            ; 9 registers
        DB      00h                             ; 1st reg = 00
        DB      000h
        DB      000h,000h,000h,000h,000h,005h,00Fh,0FFh  ; 17
; end of list!
        DB      0,0                             ; type 0 = end of list ; Page Definitions
pgts    label   byte
        DW      0                               ; page token
        DW      0                               ; page start offset
        DW      1F40h                           ; page length (bytes)
        DW      320,200                         ; 320x200
        DW      0,0,0                           ; 3 reserved words DB      001h,000h,000h,020h,040h,01Fh
        DB      040h,001h,0C8h,000h,000h,000h
        DB      000h,000h
        DB      000h,000h

CXETEND EQU     $
```

Figure 16B:
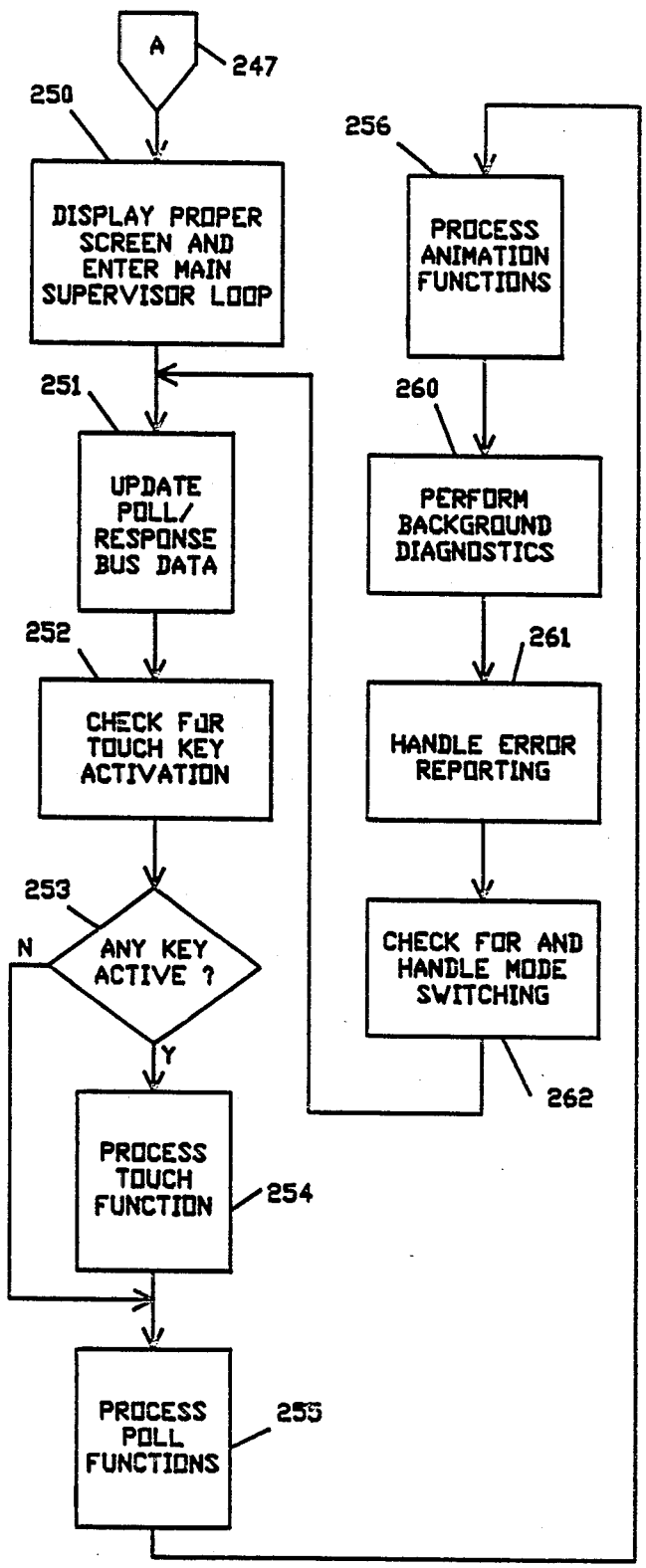

FIGS. 16A and 16B diagram the logic of the Supervisor control program portion of the 8088 code. The 8088 code Supervisor begins execution after the System Reset block 230. Next the Power On Self-Test (P.O.S.T.) block 231 is performed. If the P.O.S.T. detects an error in the system block 232, then the system is halted, block 248, otherwise the 8088 segment registers are initialized, block 233. Communication is established with the 8031, block 234, and the 8031 Power On Self- Test results are inspected, block 235. If the 8031 Power On Self Test has detected a failure then the system is also halted block 248, otherwise system initialization proceeds with block 236 which initializes the video graphics array registers for the appropriate display device and resolution. Next the Interprocessor Data Link circuits are exercised between the 8088 and 8031, block 240. If an error is detected in the data link then the system is halted, blocks 241 and 248, otherwise the Video Gate Array registers and Video Buffer are tested, block 242, and a decision is made whether to proceed or halt, block 243. If no Video Gate Array or Video Buffer error is detected then the 8031 table which defines the message IDs to store and the messages to respond to on the Poll/Response bus are loaded, block 244. Next, system interrupts are enabled and the appropriate screen is displayed, block 245. Next, communications is established on the Poll/Response bus, block 246 and the flow continues on FIG. 16B off page by way of connector block 247. Next, FIG. 16B, the proper screen is displayed and the main supervisor loop is entered, block 250. The Poll/Response bus data is then updated, block 251. Next, check is performed for touch key activation, block 252. If any key has been pressed, decision block 253, the particular touch function associated with that key is then performed, block 254, otherwise block 254 is bypassed. Next, Poll functions are processed as described in the screen data for the particular screen being displayed, block 255. Next, Animation functions present on the current screen are processed, block 256. Background diagnostics are then performed on the system, block 260, and any error detected there or from any other component of the system are handled by block 261. Next, a check is made for any Mode switching which is needed, block 262. This could include the system operator of the vehicle changing the key switch from Off to Run, to Crank, or Accessory modes or by the reception of an error message from another component in the system such as the Body Control systems.

Figure 17:
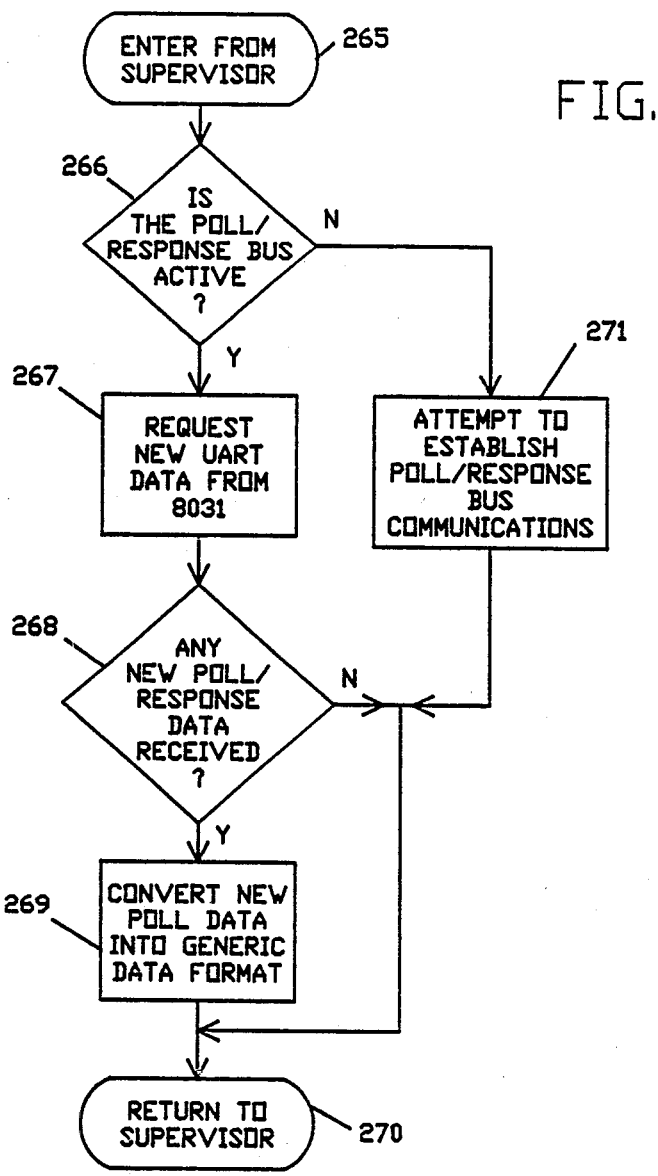
FIG. 17 illustrates a flow chart representing the Poll/Response bus communication data update program.
Figure 18:
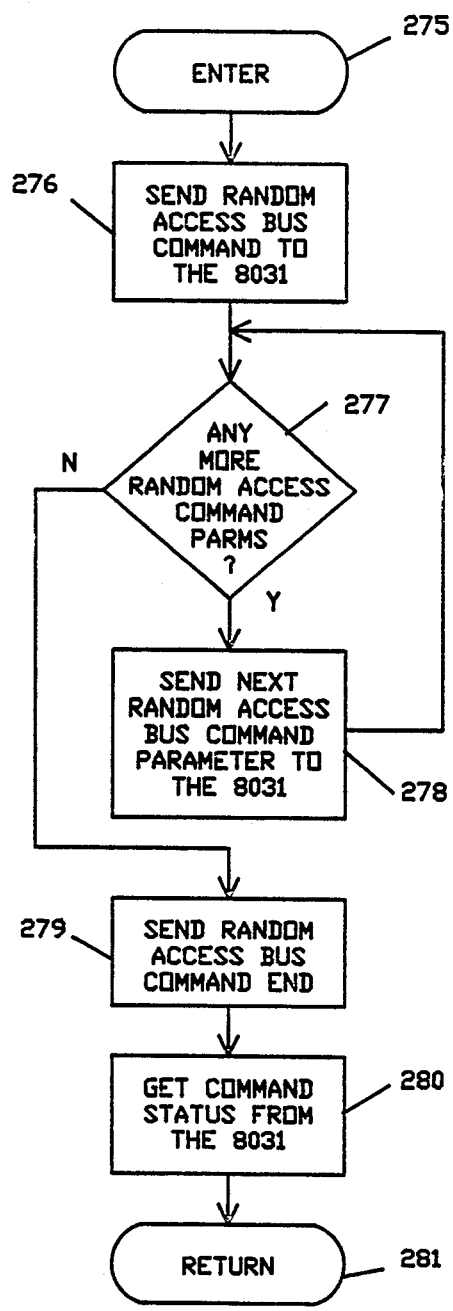
FIG. 18 illustrates a flow chart representing the program for processing the Random Access bus command.

FIG. 17 details the flow of the Poll/Response bus communication data update routine in the 8088 code. This Routine is entered from the Supervisor via block 265 and first checks if the Poll/Response bus communication has been established, block 266. If not yet established, then an attempt is made to do so, block 271. If this attempt fails, then the routine returns to the Supervisor, block 270, otherwise if communication has already been established new Poll/Response bus data is requested from the 8031 microprocessor, block 267. If any new data has been received, block 268, then that data is converted into a generic format and return is passed to the supervisor, otherwise return is passed to the Supervisor without converting the old data into the generic data format a second time.

FIG. 1 details the flow of the Random Access bus command handler in the 8088. It is entered from various routines in the 8088 code at block 275. It first sends the Random Access bus command to the 8031 microprocessor, block 276, and then sends any additional command parameters, blocks 277 and 278 until all parameters have been sent. Next, it sends the Random Access bus command end, block 279, it then gets command status from the 8031 microprocessor which indicates command execution state or completion of the command by the 8031 microprocessor, block 280, and then returns to the calling routine, block 281.

Figure 19A:
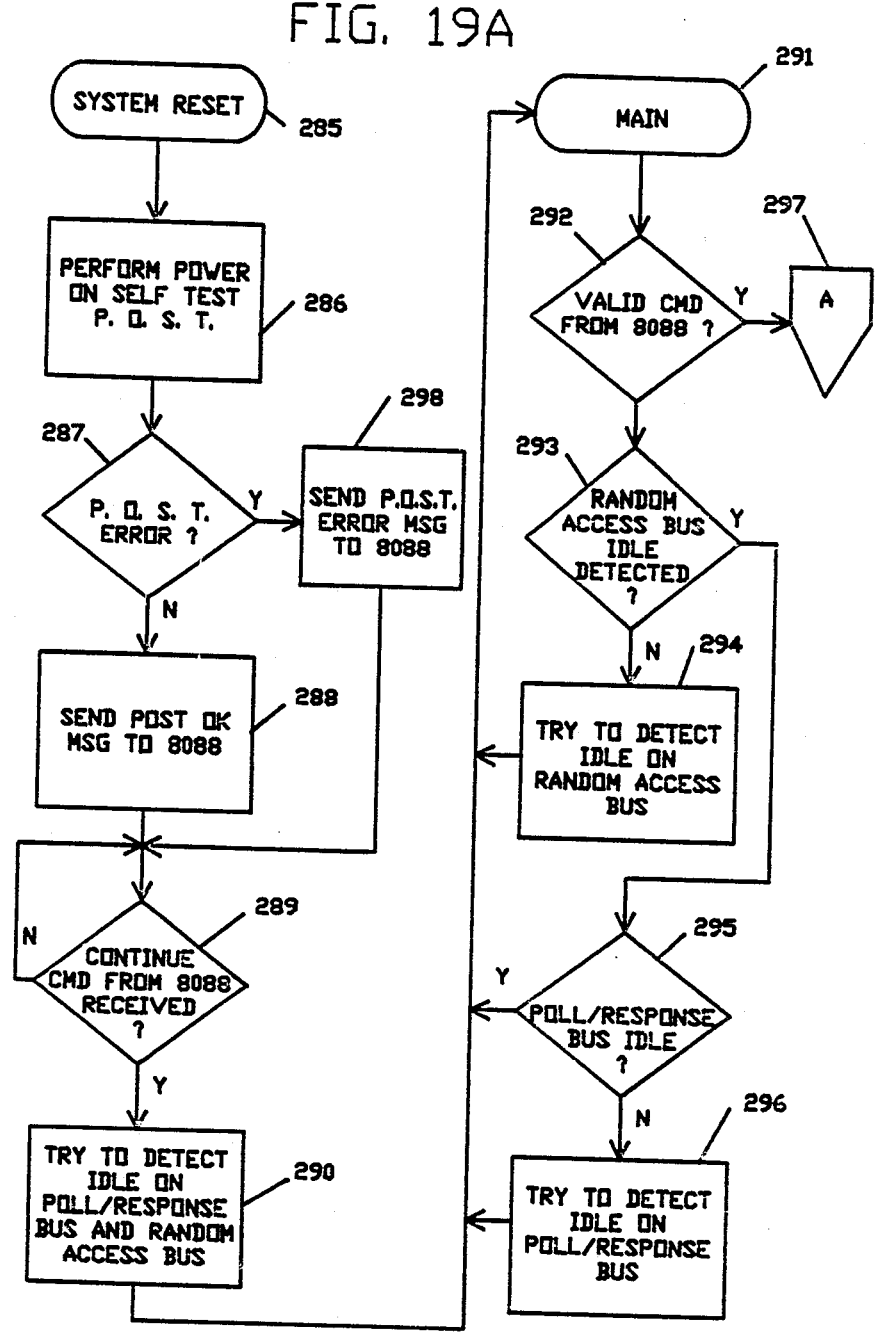
Figure 19C:
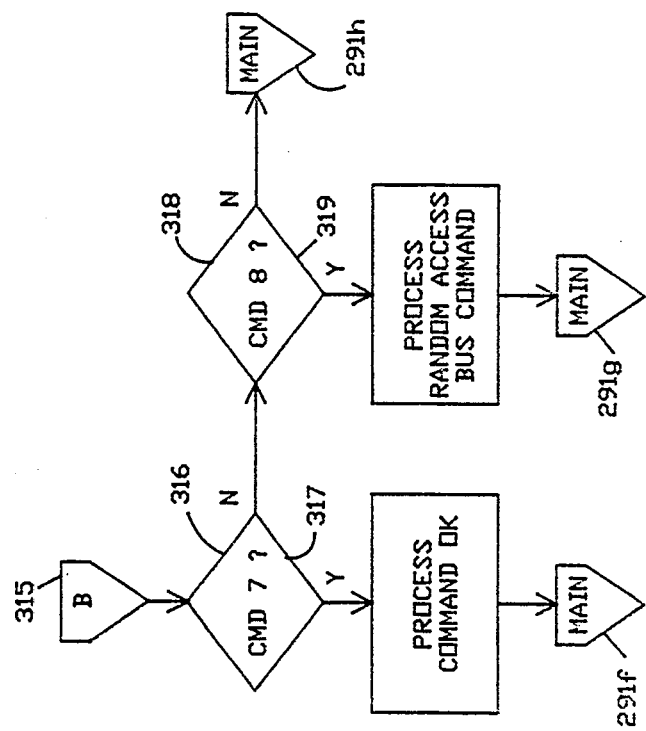

FIGS. 19A, 19B and 19C detail the flow of the 8031 Supervisor program. It begins with system reset, block 285, performs its Power On Self Test (P.O.S.T.) block 286, and sends the results of the P.O.S.T to the 8088 microprocessor, blocks 287, 288, or 298, depending on whether an error is detected or not. It then waits for the Continue command from the 8088 to be received, block 289. After the continue command is received, the 8031 Supervisor tries to detect an idle condition on the Poll/Response bus and Random Access bus before it enters the Main Supervisor loop, 291. In the Main Supervisor loop, block 292 checks for a valid command from the 8088 processor. If no valid command is received, a background idle detection routine is invoked if the main idle detect routines were unsuccessful before entering the Main Supervisor loop. These blocks include 293-296, otherwise block 292 is continually executed until a valid command is received from the 8088. When a valid command is received, block 292 passes control to the off page connector, block 297, which continues on FIG. 19B by reading in the command from the command port, block 300, and then determining which command type has been received. Six commands designated 0, 1, 2, 3, 4, 5, are shown in FIG. 19B. These commands include Diagnostic command (0), Load Message ID table command (1), Load Message Response table command (2), Command End (3), Read Poll/Response bus data (4), and Store Poll/Response bus response message (5). Additional commands 7 and 8 are shown in FIG. 19C. They include the Process command OK command (7) and the Random Access bus command (8). After each command is executed the 8031 code returns control to the Main Supervisor loop 291 to look for more commands, by way of blocks 291 a-g.

Figure 20:
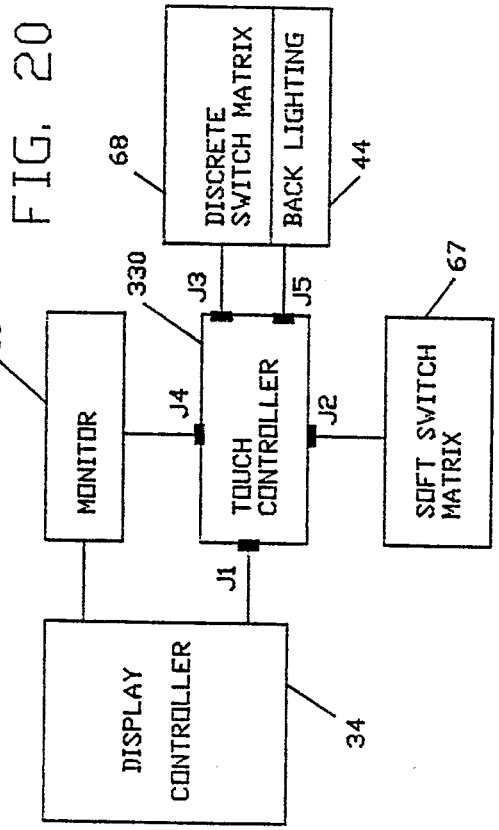
FIG. 20 is a modified block diagram of a microprocessor-based touch controller illustrating its interconnections with the Display controller, monitor, switch matrices and backlighting.
Figure 22:
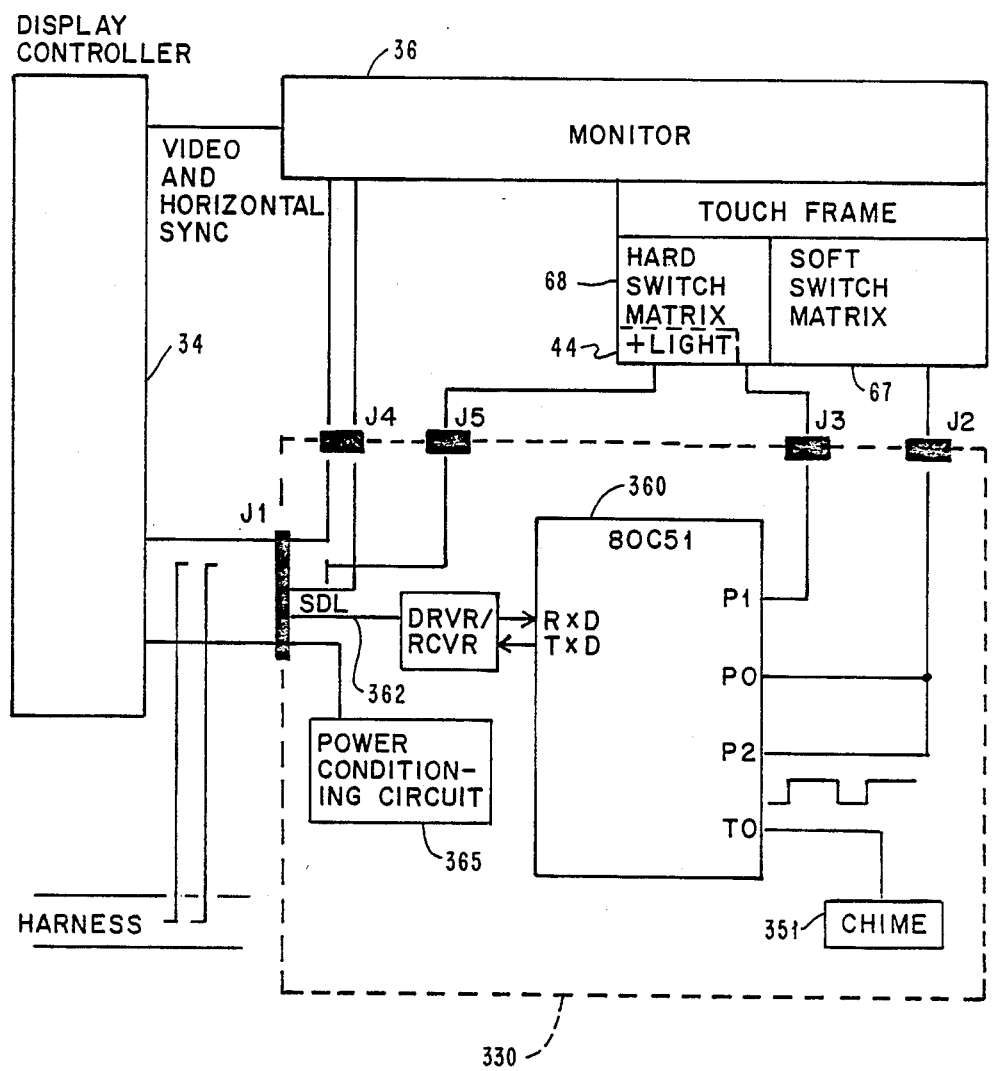
FIG. 22 illustrates more details of the touch controller shown in FIG. 20.

A microprocessor-based touch controller designs, FIGS. 20 and 22, replaces a switch decode card version and allows for considerable improvement in system cost, reliability, and performance.

The automotive display assembly described herein, besides a Display controller comprises a monitor, a display oriented soft touch input device, a set of discrete hard switches located below the monitor, and a touch controller serving as a decode logic board. The controller logic decodes the soft (touch input) and the hard switch matrices. This assembly meets automotive environmental requirements.

In FIG. 20, the assembly comprises touch controller card 330 interconnected with the Display controller 34, the CRT monitor 36, the soft switch matrix 67, and the discrete switch matrix 68 with backlighting 44. Touch controller 330 electrically interfaces the switch matrices to the Display controller 34, incorporates an annunciator for audible feedback, and acts as a pass-through for signals from Display controller 34 and wiring harness to monitor 36.

Figure 21:
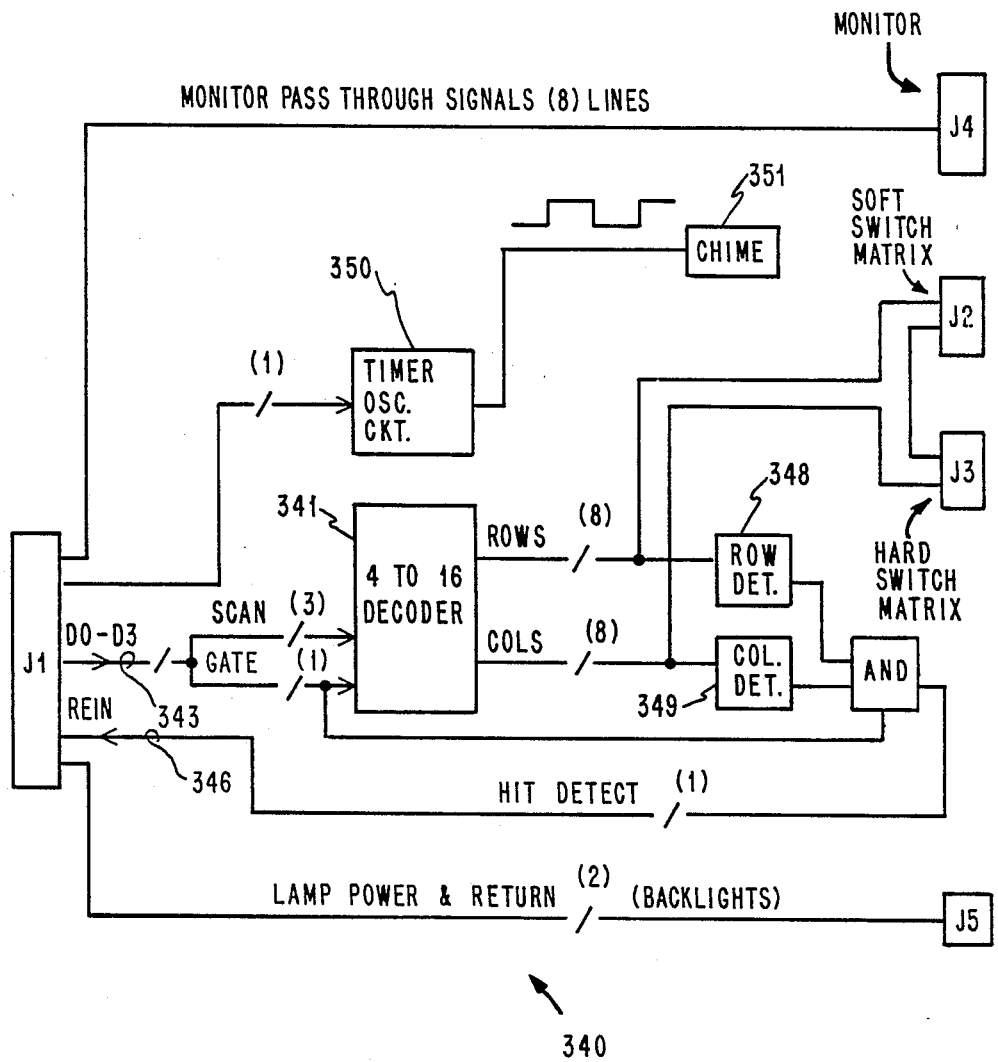
FIG. 21 shows a prior switch decode card for use in a Display controller system.

In order to put the microprocessor touch controller version in perspective, a non-microprocessor version is first discussed. FIG. 21 is a block diagram of one version of a switch decode card 340. The card scans an 8×8 soft/hard switch matrix connected by way of junction connectors J2 and J3 and detects a switch closure allowing a Display controller (such as Display controller 34) to identify an activated switch. The rows and columns of the matrix are driven by the outputs of a 4 to 16 decoder 341. Outputs 0 through 7 of the decoder 341 drive the respective rows, and outputs 8 through 15 drive the respective columns. Only one output of decoder 341 is on (active low) at any one time with the rest of the outputs tristated. The four inputs of the 4 to 16 decoder 341 are driven by four data lines D0-D3 via bus 343 from the Display controller by way of connector J1. The Display controller scans the rows of the matrix by incrementing D0–D2 while keeping D3 low. Line D3, when low, enables the column detect logic 349 to drive the detect input signal (REIN) on line 346 to the Display controller. When high, D3 enables the row detect logic 348 to drive REIN. The Display controller reads REIN after each increment for a possible switch hit on the columns. When a switch is activated, the low level placed by the decoder 341 on the row associated with that specific switch is transferred to the corresponding column. This action drives REIN low, causing the Display controller to save the specific row number and to start scanning the columns in order to determine the column number for the activated switch. In addition to switching decoding, the switch decode card 340 contains a timer oscillator circuit 350 to drive a chime 351 which is activated by the Display controller when a valid switch hit occurs. Some signals from the Display controller are routed through this card to the monitor via connector J4 and the back lights via connector J5.

FIG. 22 is a block diagram of another version of touch controller, i.e., a microprocessor-based touch controller 330 within its system configuration. Touch controller 330 incorporates an Intel microcontroller 360 which includes an 80C51 microprocessor, 4K bytes of ROM, 128 bytes of RAM, two 16 bit timers/counters, four 8 bit parallel ports, and a serial port all on-board. The touch controller 330 interfaces to the Display controller 34 over the Serial Data Link (SDL) line 362 through connector J1 and the serial port (Driver/Receivers) within the 80C51. The parallel ports P0, P1, P2 of the 80C51 are used to drive the rows and columns of the switch matrices 67 and 68 and backlighting 44 via connectors J2 and J3. One of the timers within the 80C51 generates the input clock signal for the chime 351. In addition this design incorporates a power conditioning circuit 365 that generates regulated +5 volts from the Display controller. This circuit provides for protection of the +5 volts line against shorts to battery or ground.

In the non-microprocessor of FIG. 21, the Display controller performs the switch scanning and diagnostics. The 80C51 based design in FIG. 22 relieves the Display controller of the above mentioned tasks which account for forty percent of the Display controller overhead. The design includes fault detection and isolation due to the added on-board intelligence of the 80C51. In addition, the parallel port approach of the design in FIG. 21 is replaced by a serial port design, thus reducing the amount of interface wiring.

While a preferred embodiment of the invention has been illustrated and described, it is to be understood that there is no intention to limit the invention to the precise construction herein disclosed and the right is reserved to all changes and modifications coming within the scope of the invention as defined in the appended claims.

We claim:

1. A display system for an automotive vehicle, said display system operating by selective partitioning of functions comprising:
(1) display means for displaying graphics and text to an operator of the vehicle;
(2) video graphics means for controlling operation of said display means, said video graphics means being reconfigurable to generate different styles of graphics and text;
(3) touch switch entry means for entry of desired function information by the operator and generation of touch input signals;
(4) discrete switch means for entry of additional function information by the operator and generation of discrete signals;
(5) a Display controller for controlling system operations;
(6) an input/output (I/O) channel incorporated in said Display controller;
(7) an interprocessor data link for transferring data and commands in said system;
(8) a master micropro;cessor incorporated in said Display controller for issuing control signals and responding to control signals representative of major system functions, said master microprocessor having associated storage means for storing master data and commands and a master control program to control major functions in said system, said major functions including control of graphics and text for display on said display means and responsive to signals from said touch switch means and said discrete switch means; and
(9) a slave microprocessor incorporated in said Display controller for issuing and responding to control and data signals involving communication with said master microprocessor in said Display controller via said input/output channel and said interprocessor data link, and said slave microprocessor having associated storage means for storing slave data and commands and a slave control program to control slave functions in said system, said slave functions including control and monitoring of communications internally within said Display controller and externally by said Display controller.

2. The display system of claim 1 further comprising:
(10) a Poll/Response bus for transmitting monitoring and control signals to said slave microprocessor involving Poll-Respnnse devices in said vehicle such as for example, engine control, body control and instrument panel modules; and
(11) a Random Access bus for transmitting control and monitoring signals to said slave micrprocessor involving Random Access devices in said vehicle such as for example, entertainment and climate control modules.

3. The display system of claim 2 further comprising:
(12) supervisor control means incorporated in the control program of said master microprocessor for automatically reconfiguring said video graphics and text as well as messages and formats in accordance with the characteristics of the vehicle in which said display system is incorporated.

4. The display system of claim 3 wherein (A) reconfiguring of said video graphics involves selective loading of tables stored in the storage means of said master microprocessor and wherein (B) said tables are used to initialize said video graphics.

5. The display system of claim 4 wherein said slave micooprocessor includes supervisor control means incorporated in the control program of said slave microprocessor operable in conjunction with the supervisor control means of said master microprocessor to support loading of message identification and response tables from said master microprocessor for processing of data and commands by said slave microprocessor via said Poll/Response bus and said Random Access bus.

6. The display system of claim 4 wherein said interprocessor data link function is performed by RAM arbitration logic that enables more rapid transfer of commands and data between the master and slave microprocessors.

7. A display system for an automotive vehicle, said display system operating in a highly effective manner by selective partitioning of functions to display status information to a vehicle operator, to receive input signals from the operator and to supply control signals to the vehicle, said system comprising:

(1) a CRT display means for displaying graphics and text to the operator;

(2) a video graphics adapter (VGA) for controlling operation of said CRT display means and for generating video signals, said video graphics adapter including a video storage means and video buffers for generating graphics and text, the video buffers being reconfigurable to generate different styles of graphics and text;

(3) touch switches mounted in conjunction with said CRT display means for entry of desired function information by the operator and generation of touch input signals;

(4) discrete switches for entry of additional function information by the operator, said switches supplying discrete input signals;

(5) circuit matrices responsive to input signals from said touch switches and said discrete switches to supply function signals to said system;

(6) a Display controller for controlling system operations;

(7) an input/output (I/O) channel incorporated in said Display controller;

(8) an interprocessor data link for transferring data and commands in said system;

(9) a Poll/Response bus for transmitting monitoring and control signals involving Poll-Response devices in said vehicle such as for example, engine control, body control and instrument panel modules;

(10) a Random Access bus for transmitting control and monitoring signals involving Random Access devices in said vehicle such as for example, entertainment and climate control modules;

(11) a master microprocessor incorporated in said Display controller for issuing control signals and responding to control signals representative of major system functions, said master microprocessor having associated storage means for storing master data and commands and a major control program to control master functions in said system, said major functions including control of graphics and text for display on said CRT display means and, said circuit matrices being responsive to said touch switches and discrete switches for supplying signals to said master microprocessor;

(12) a slave microprocessor incorporated in said Display controller for issuing and receiving control and data signals involving communication with said master microprocessor in said Display controller via said input/output channel and said interprocessor data link, and said slave microprocessor having associated storage means for storing slave data and commands and a slave control program to control slave functions in said system, said slave functions including control and monitoring of communications internally within said Display controller and externally of said Display controller with devices attached to said Poll/Response bus and said Poll/Response bus and said Random Acces bus.

8. The display system of claim 7 further comprising:

(14) supervisor control means incorporated in the control program of said master microprocessor for automatically reconfiguring said video graphics and text as well as messages and formats in accordance with the characteristics of the vehicle in which said display system is incorporated.

9. The display system of claim 8 wherein (A) reconfiguring of said video graphics involves selective loading of tables stored in the storage means of said master microprocessor and wherein (B) said tables are used to initialize said video graphics.

10. The display system of claim 9 wherein said slave microprocessor includes supervisor control means incorporated in the control program of said slave microprocessor operable in conjunction with the supervisor control means of said master microprocessor to support loading of message identification and response tables from said master microprocessor for processing of data and commands by said slave microprocessor via said Random Access bus.

11. The display system of claim 7 wherein said circuit matrices (5) further comprise a touch microcontroller interconnected between said touch switches and said discrete switches and said Display controller and serving to scan said switches in order to determine the status thereof and provide status signals to said Display controller.

12. The display system of claim 11 wherein said display system further comprises a chime to advise an operator of a valid switch entry and wherein said touch microcontroller includes (a) timer means to generate a clock signal to operate said chime and (b) a power conditioning circuit to protect a power line against shorts to battery or ground.

* * * * *